United States Patent
Adelman

(10) Patent No.: US 9,626,387 B2
(45) Date of Patent: Apr. 18, 2017

(54) VOLUMETRIC VECTOR NODE AND OBJECT BASED MULTI-DIMENSIONAL OPERATING SYSTEM

(71) Applicant: ATLYS, INC., South Jordan, UT (US)

(72) Inventor: Charles Nathan Adelman, Thousand Oaks, CA (US)

(73) Assignee: Charles Nathan Adelman, Sandy, UT (US)

( * ) Notice: Subject to any disclaimer, the term of this patent is extended or adjusted under 35 U.S.C. 154(b) by 124 days.

(21) Appl. No.: 14/256,530

(22) Filed: Apr. 18, 2014

(65) Prior Publication Data

US 2015/0302031 A1 Oct. 22, 2015
US 2016/0306825 A9 Oct. 20, 2016

Related U.S. Application Data

(60) Provisional application No. 61/814,177, filed on Apr. 19, 2013.

(51) Int. Cl.
*G06F 17/30* (2006.01)
*G06Q 30/02* (2012.01)

(52) U.S. Cl.
CPC .. *G06F 17/30289* (2013.01); *G06F 17/30592* (2013.01); *G06F 17/30607* (2013.01); *G06Q 30/0277* (2013.01)

(58) Field of Classification Search
CPC ........ G06F 17/30289; G06F 17/30607; G06Q 30/0277

USPC .................................................. 707/805, 831
See application file for complete search history.

(56) References Cited

U.S. PATENT DOCUMENTS

| | | | | |
|---|---|---|---|---|
| 8,786,407 B2* | 7/2014 | Liu | ...................... | B65D 19/001 340/10.1 |
| 2010/0299489 A1* | 11/2010 | Balachandriah | .... | G06F 11/3442 711/162 |
| 2011/0066948 A1* | 3/2011 | Tsao | .................. | G06F 17/30893 715/739 |
| 2012/0075071 A1* | 3/2012 | Liu | ...................... | B65D 19/001 340/10.1 |
| 2013/0005349 A1* | 1/2013 | Sanders | .................... | G01S 3/30 455/456.1 |
| 2014/0213298 A1* | 7/2014 | Marti | .................... | G01S 5/0252 455/456.3 |
| 2015/0006128 A1* | 1/2015 | Enenkel | .............. | G06F 17/5036 703/2 |
| 2015/0006141 A1* | 1/2015 | Enenkel | .............. | G06F 17/5036 703/18 |

* cited by examiner

*Primary Examiner* — Phong Nguyen
(74) *Attorney, Agent, or Firm* — Stoel Rives LLP

(57) ABSTRACT

A method for the visualization and addressing of data within a volumetric container, using XYZ coordinates represented as a vector. Whereas users build their own immersive experience, variants, and/or representations of their respective data as polygons nested within a virtual universe. This includes variants such as time, space, velocity and trajectory as they relate to data containers, and the tracking of each user's multi-dimensional representations. This method also creates permanent threaded connections between web data, social communities and data retrieved from any other source, to a structured polygon based correlation library.

14 Claims, 32 Drawing Sheets

Diagram of rigid containers and their relationship to surface communities

**Volumetric Operating Container
with Vector Based Addressing System**

Flowchart diagram of Core Software Engines

Sphere of Influence as it relates to a user's Core Vector.

Nested Spheres of Influence as they relate to a user's Core Vector.

Illustration of a typical user's volumetric container

Illustration of user's node and Sphere of Influence volume calculations

**Diagram of the Sphere of Influence *(soi)* Security Protocols as they relate to the user's container**

**Diagram of the Sphere of Influence *(soi)* Security Protocols as they relate to the Operating Container**

Example of Interaction between two user's Sphere of Influence

Diagram of interaction between outside data, including advertising, and how users can control the permeation of information layer by layer

Data States of two for more containers

**Container relationships via Vector Node *(vN)* addressing on both a linear present timeline and multi-dimensional timelines**

Universe Engine with Vector Based Addressing System

Core Vector (CV) and Vector Node (VN) relationships

Sphere of Influence (*soi*)

Movement of Vector Data with Event Triggers on a Single Linear Timeline

Vector and Pixel Movement influenced by other forces of data in X, Y and Z space

Example usage of intersecting vector data and the creation of new vector data and corresponding volumetric containers.

Multi-Dimensional Vector Data with Time Spirals

(T) = Time
(p) = Past
(rT) = Reverse Time

Calculations for inter-vector nodes created between two (2) or more containers on the same dimensional plane.

Calculations for inter-vector nodes created between two (2) or more containers on different dimensional planes.

Structure diagram of a user's typical container

Diagram of rigid containers

Diagram of rigid containers and their relationship to surface communities

Inter-community diagram showing synergistic data relationships and exchanges

Intra-community diagram showing data visually represented as particle systems

Sphere of Influence example when enclosing a polygon based social community and the sub-surface relationship to any connected rigid containers

Immersive Corollary Library Engine (ICL)

Immersive Corollary Library Tethering

Vector Address and Object to URL Tethering

View of two respective user containers and their distinct vector addresses

Point-to-point methods of transportation

Advertising during virtual transportation

VOLUMETRIC VECTOR NODE AND OBJECT BASED MULTI-DIMENSIONAL OPERATING SYSTEM

PRIOR APPLICATIONS

This application claims priority from Provisional Application Ser. No. 61/814,177, filed Apr. 19, 2013.

BACKGROUND OF THE INVENTION

As data usage grows, and users have a myriad of ways to control and visualize their data, including social networking, video games and educational or other such environments, there is no single method to consolidate data into a tactile graphical interface which not only connects their data but connects their relationships to each other. There are millions of applications, programs, websites, search engines, social communities and other related and unrelated technologies, applications, platforms and content that are currently disparate and the only overall connection between them is when a user manually makes a connection via search engines or other form of social connection. With the advancement of mobile technology and wireless data exchanges, there is no one single point-of-entry to access all of this information in a tactile, immersive social environment.

BRIEF SUMMARY OF THE INVENTION

In a preferred embodiment, the invention includes an overall virtual universal container known as the master volumetric operating container, or "SoftSpace," that sets the finite end points, which can infinitely expand, at which virtual and visual representations of data cannot move beyond. This immersive virtual operating system, or operating container, ingests data from any existing source (for example web, intranet, extranet, local, remote, or any other form of data communication and exchange) through an immersive corollary database that makes a one-to-one connection between the object or meta-data as it exists in its current incarnation, and links it to a vector based three-dimensional model or models that correlate to the type of object being represented.

DETAILED DESCRIPTION OF THE INVENTION

The inventive subject matter provides a means to dynamically re-draw current and future intranet, extranet, internet, legacy network or any other threads and data into an immersive tactile user interface, or volumetric operating system, which can also be represented in a number of visual formats. The master architecture of this system, or Volumetric Operating Container, as referenced in FIG. 1, describes the absolute container (100) which is the outermost constantly expanding barrier in which all data is visualized. At the absolute center of the volumetric operating container is the Prime Vector (101), which is always represented as an XYZ coordinate with a time (T) signature variable: (XYZT) or (0,0,0,0) PRIME This vector is the same on all multi-dimensional timelines. This creates the starting point for a distinct volumetric addressing system where three (3) coordinates and a time signature create the address. Since the operating environment can span across multiple visual and computed dimensions, the PRIME address always stays the same.

Figure 1:
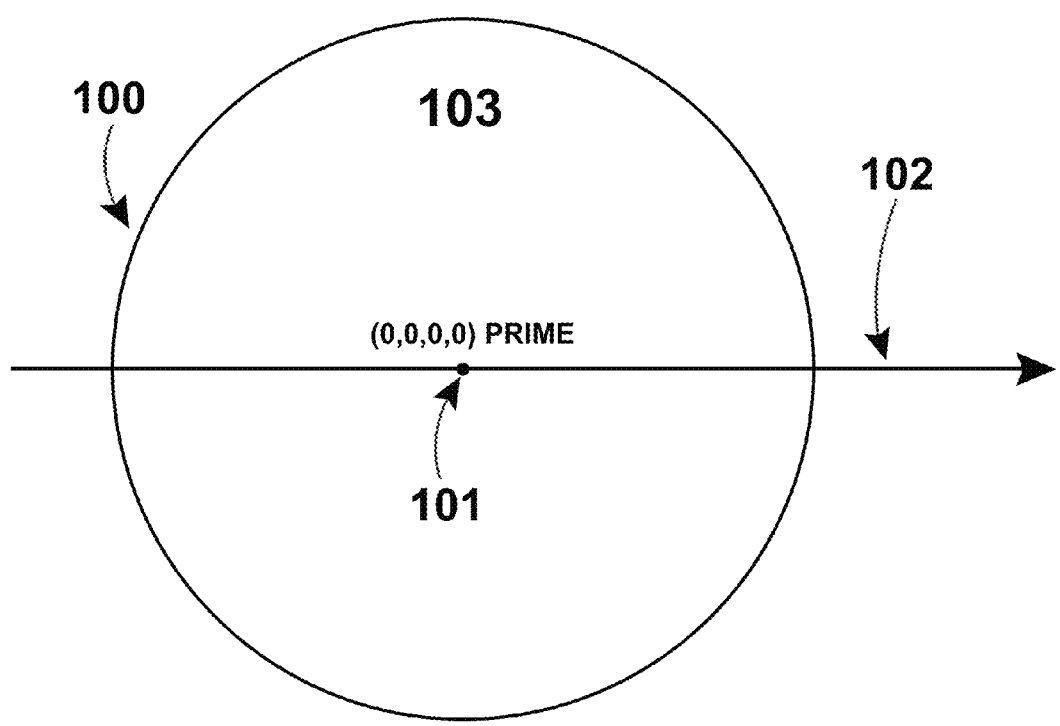
FIG. 1 Diagram describing the absolute volumetric operating container as it exists within a present timeline.

FIG. 1 represents an initial dimension, or plane, where a single layer (102) represents a simple linear time sequence of data events. Any unused, or null (103) data is held as possible future volumetric space to be utilized.

Figure 2:
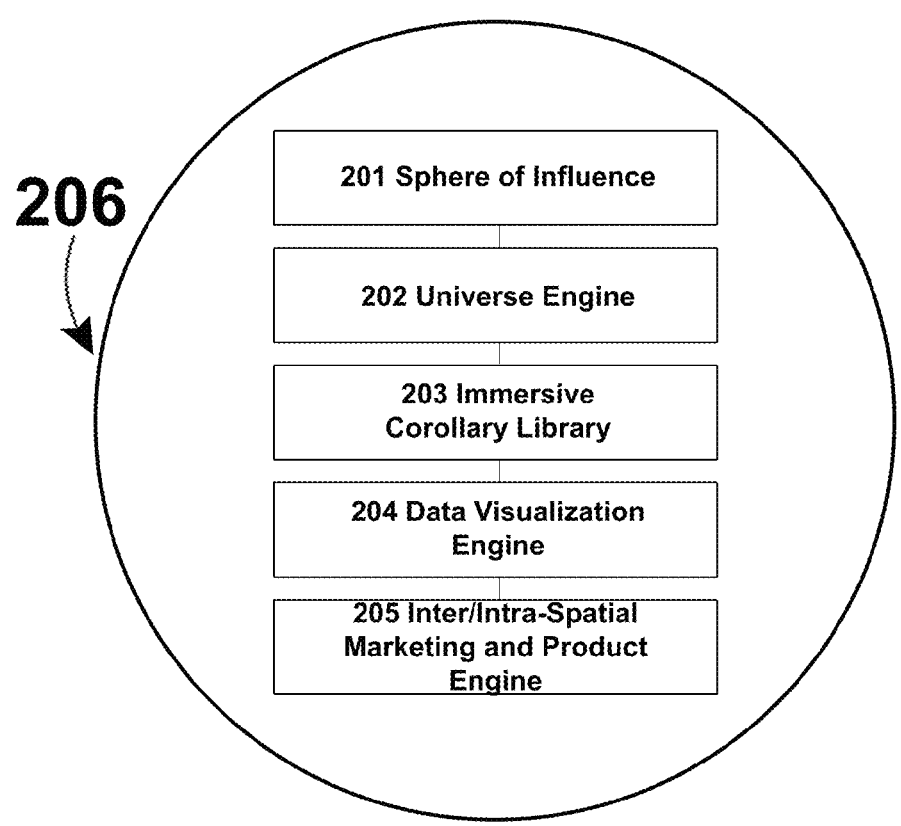
FIG. 2 Flowchart diagram of the Core Software Engines: 1) Sphere of Influence, 2) Universe Engine, 3) Immersive Corollary Library, 4) Data Visualization Engine and the 5) Inter/Intra-Spatial Marketing and Product Engine.

Initially there are five core software engines that work in unison to form the architecture of this operating system as referenced in FIG. 2. For example: Sphere of Influence (soi) (201), Universe Engine (202), Immersive Corollary Library (ICL) (203), Data Visualization Engine and the (204) Inter/Intra-Spatial Marketing and Product Engine (205). The Volumetric Operating Container (206) is the combined software apparatus that binds the software engines into a unified operating system.

Figure 3:
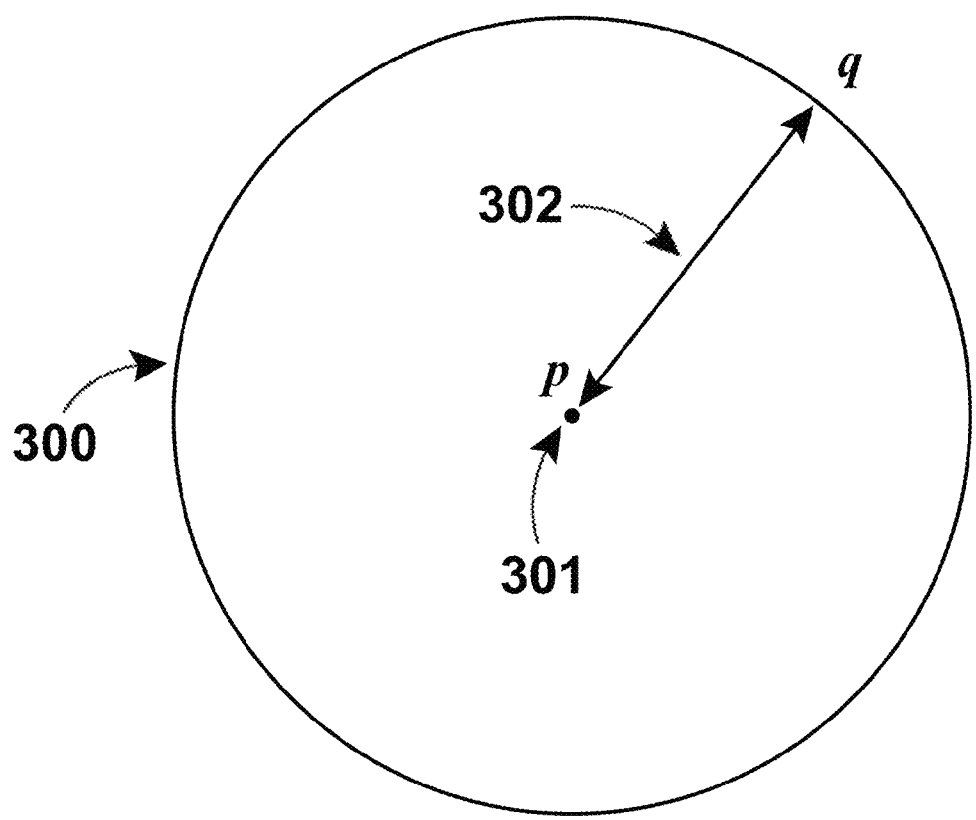
FIG. 3 is a diagram of a basic container utilizing the Sphere of Influence engine.

Much like the Volumetric Operating Container, users can obtain an XYZ coordinate, or address, with a specific volumetric area around their core vector (CV) known as the Sphere of Influence. These addresses can be obtained by various methods including, but not limited to leasing, renting, registering, purchasing, subscribing or inheriting. FIG. 3 outlines the simplest structure of a user's container where the Outer Sphere of Influence (300) represents the outermost structure that holds a user's volumetric information. This volume can be expanded based on how much virtual space each user obtains. At the absolute center of each user's container is the Core Vector (301), which is a distinct address identifier. Distance (302) from a user's Core Vector (CV) to the Outer Sphere of Influence is calculated using the three dimensional Euclidean distance equation:

$$d(p,q,)=\sqrt{(p_1-q_1)^2+(p_2-q_2)^2+(p_3-q_3)^2}$$

Each distinct vector address will include additional meta data that creates a distinct address which only that destination will have, identified with an XYZ address where the distance to that vector from (0,0,0,0) PRIME is calculated by:

$d(p,q,)=\sqrt{(p_1-q_1)^2+(p_2-q_2)^2+(p_3-q_3)^2}$, where "p" represents (0,0,0,0) PRIME and "q" represents a user's Core Vector.

Figure 4:
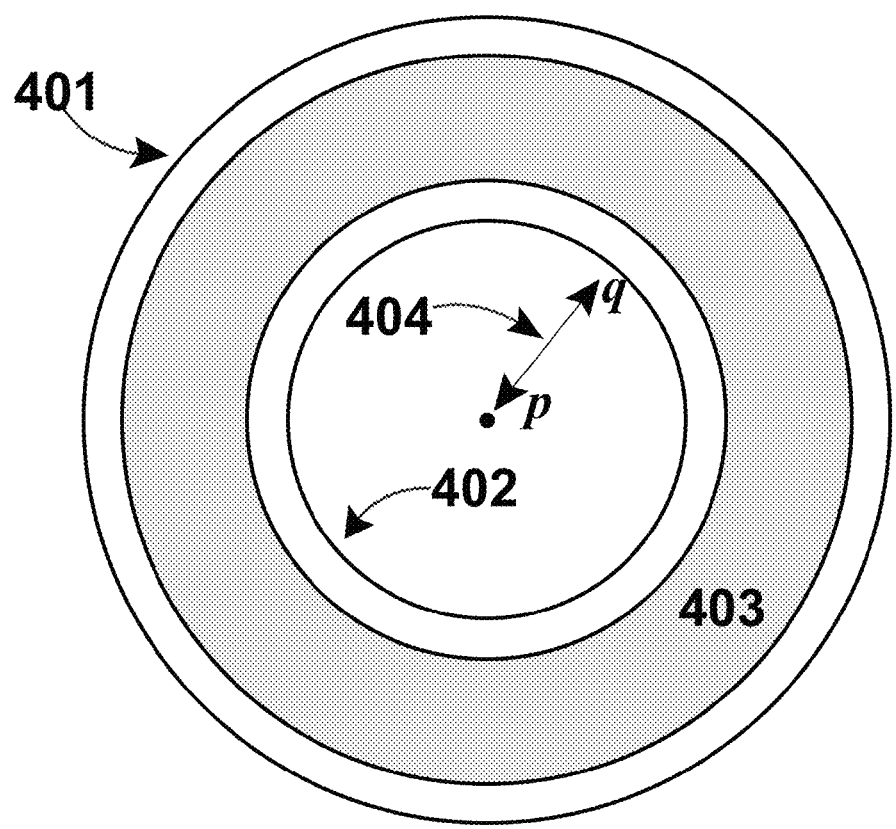
FIG. 4 is a deeper nested view of how the Sphere of Influence container is calculated from a macro to micro perspective.

Multiple Spheres of Influence can exist within a user's container. Referencing FIG. 4, Spheres of Influence nest within each other creating a multi-layer, multi-directional hierarchical management system which is visually implemented through spheres and/or polygon based containers. From a data and visual control perspective, The Outer Sphere of Influence (401) is the outermost control layer in which user has absolute control over the volumetric content or information within this container. The Inner Sphere of Influence (402) is the closest in distance to the user's Core Vector. Between these two containers are the Interim Spheres of Influence (403) which represent all additional containers that exist between the outer and inner spheres.

Distance from a Core Vector (404) to the surface of any Sphere of influence uses the Euclidean distance equation as is calculated as follows:

$d(p,q,)=\sqrt{(p_1-q_1)^2+(p_2-q_2)^2+(p_3-q_3)^2}$, where "p" represents the Core Vector and "q" represents any Interim Sphere of Influence.

Figure 5:
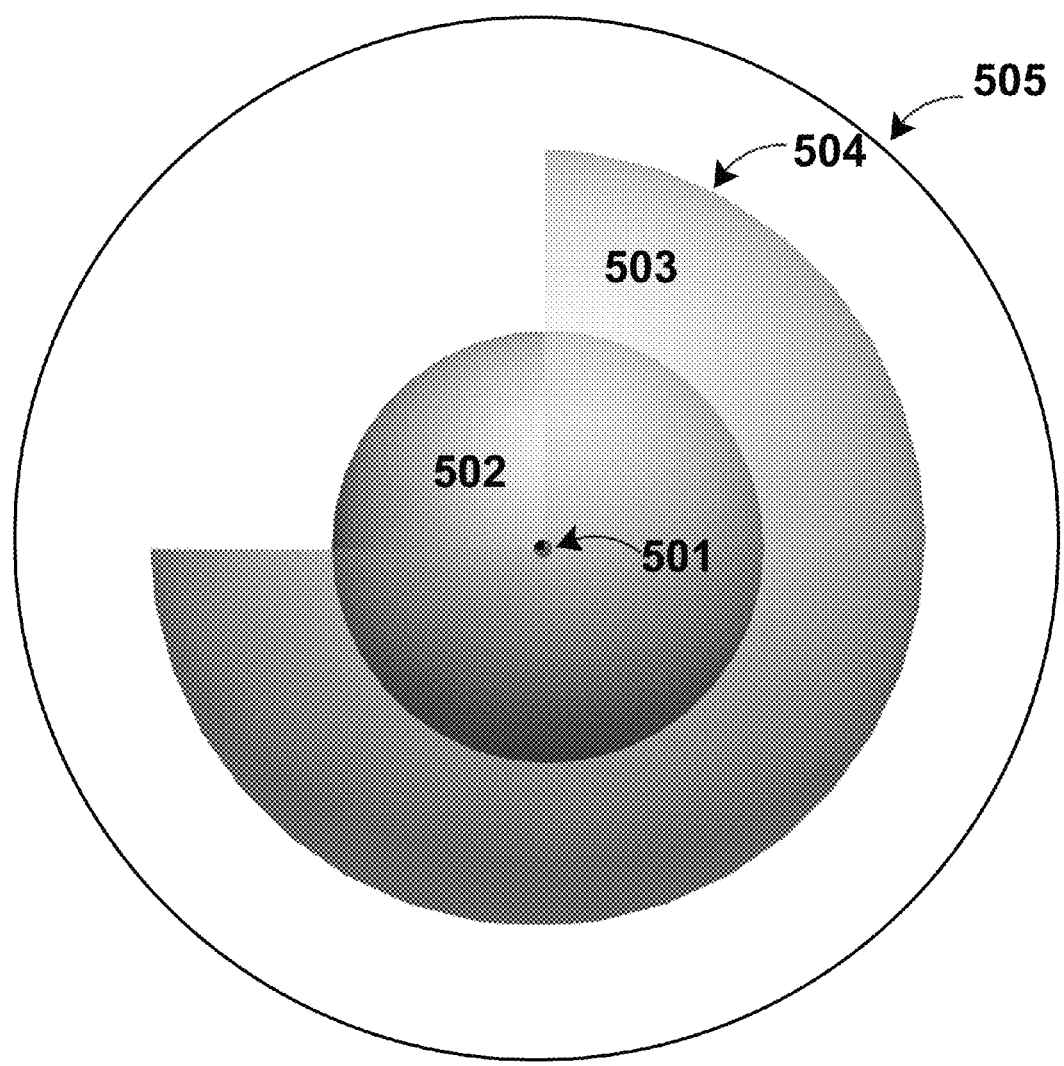
FIG. 5 Illustration of a typical user's volumetric container including visual representation of a user's Core Vector, Core and Node.

FIG. 5 illustrates the visual implementation of a typical user's volumetric container where there is an absolute center, or Core Vector (501). From center outward, the first container is the core (502), the most secure container which is used as a personal data storage mechanism. The Terrene (503) is the primary physical container which is visually represented as a solid surface. The Terrene Surface (504) is the primary mapping surface in which a user can place polygons or other data that is represented as three-dimensional models. The Sphere of Influence (505) is the outer visual container.

Figure 6:
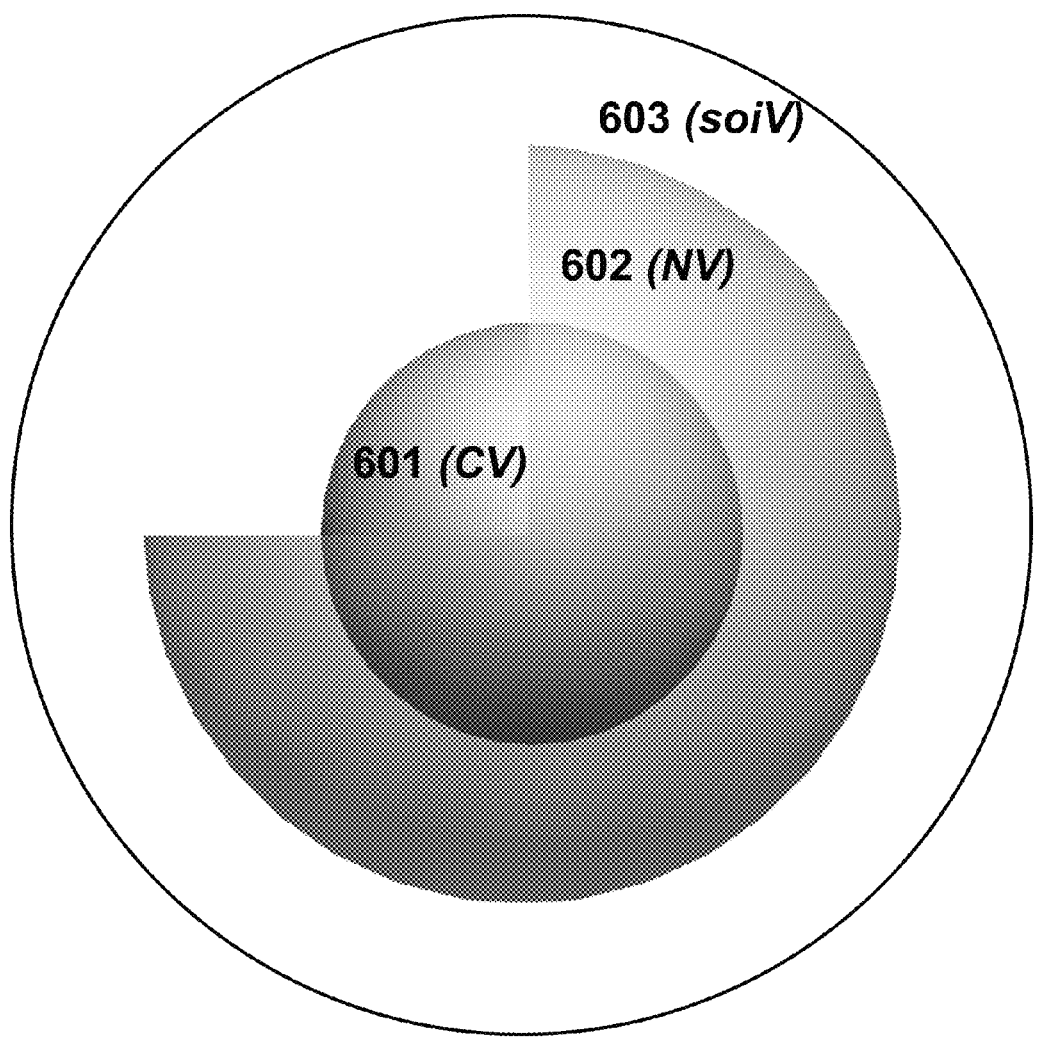
FIG. 6 Illustration of user's node and Sphere of Influence volume calculations.

Since each user's container occupies a specific amount of volumetric space, FIG. 6 illustrates calculations for the following containers:

Core Volume (601): $(CV)=4/3\pi r^3$

Figure 7:
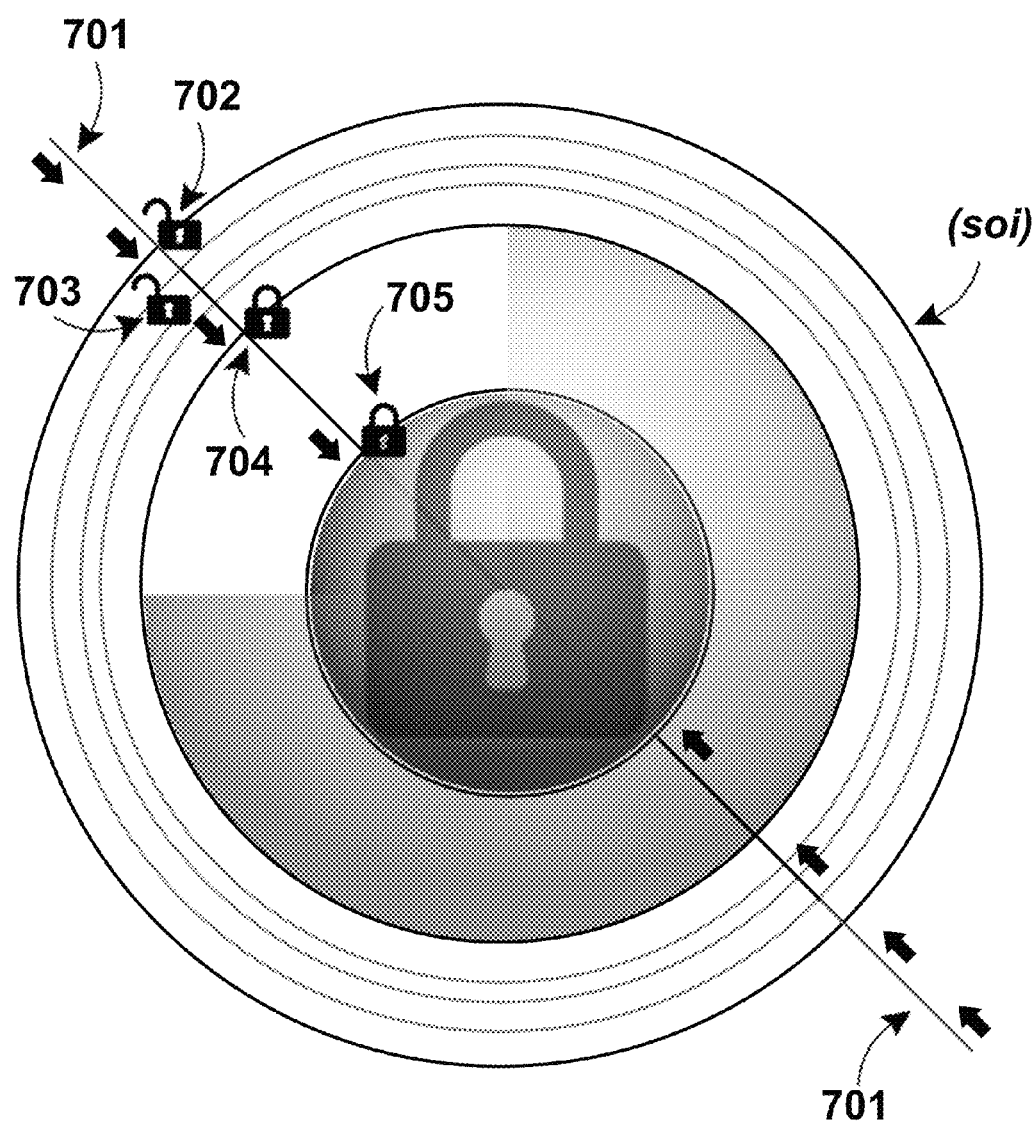
FIG. 7 Diagram of the Sphere of Influence container security protocols as they relate to a parent container.

Terrene Volume (602): $(TV)=4/3\pi r^3-(CV)4/3\pi r^3$ which represents a boolean value Sphere of Influence Volume (603) $(soiV)=4/3\pi r^3-((TV)4/3\pi r^3-(CV)4/3\pi r^3)$ where both (TV) and (CV) create a boolean expression from the (soiV) volume Each container or layer has distinct security filters and protocols as they relate to a specific user or user's container. Users have control over data or objects that permeate any of their containers, or spheres, by enabling, disabling or adjusting security protocols for each layer. FIG. 7 illustrates a semi-spherical cross section showing different security layers, where the path of data (701) begins outside of the containers and then moves inward towards the Core Vector (CV). The outer security layer (702) represents the outermost barrier for data to enter the Sphere of Influence (soi). The interim sphere's security layers (703) can have multiple values allowing some information to pass through while disallowing specific data to pass. The Terrene security layer (704) allows or denies any objects to be embedded on the Terrene surface, which includes any advertising or outside polygon models that are not sourced directly through the user. The core security layer (705) is the most secure area of all of the containers, holding sensitive or critical user data. For example: credit card numbers, bank information, passwords and any other sensitive data.

Figure 8:
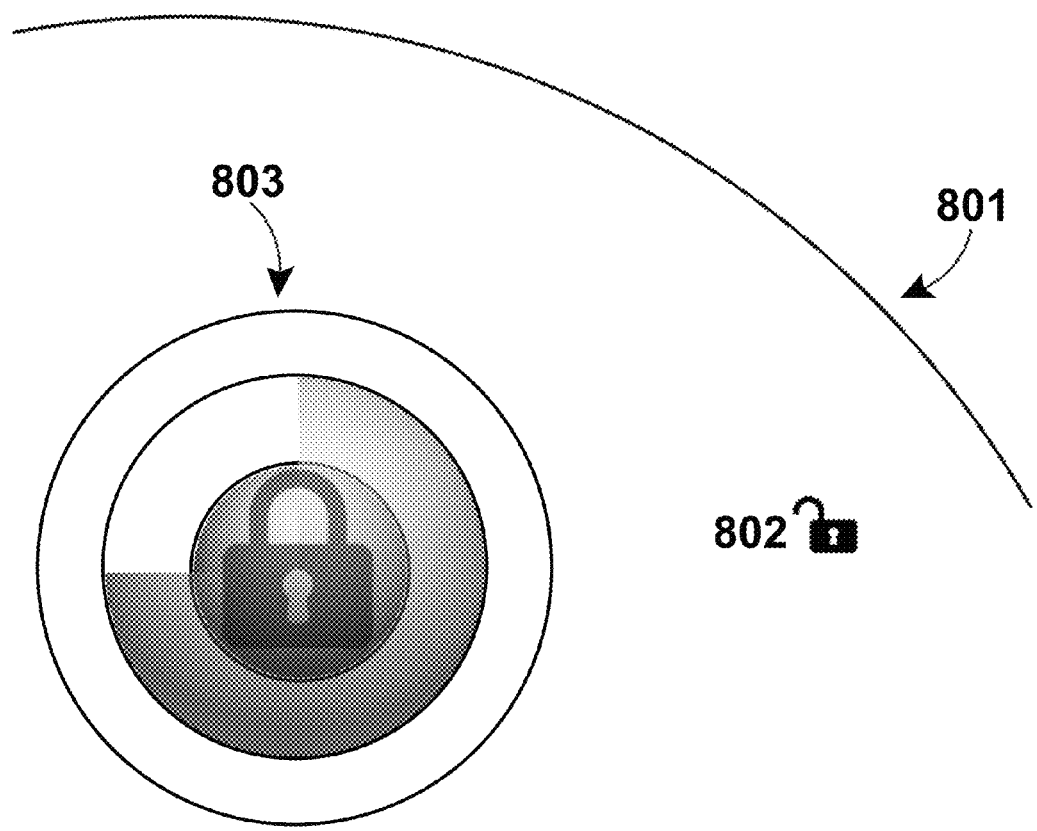
FIG. 8 Diagram of the Sphere of Influence container security protocols as they relate to the Operating Container.

User containers, centered on a distinct Core Vector (CV), inherit the operating container's security protocols outside of the user's Sphere of Influence (soi). FIG. 8 illustrates the relationship between the operating container (801) and the user's container (803), as well as the operating containers security protocols (802) which take priority over all security protocols outside of a user's Sphere of Influence (soi).

Figure 9:
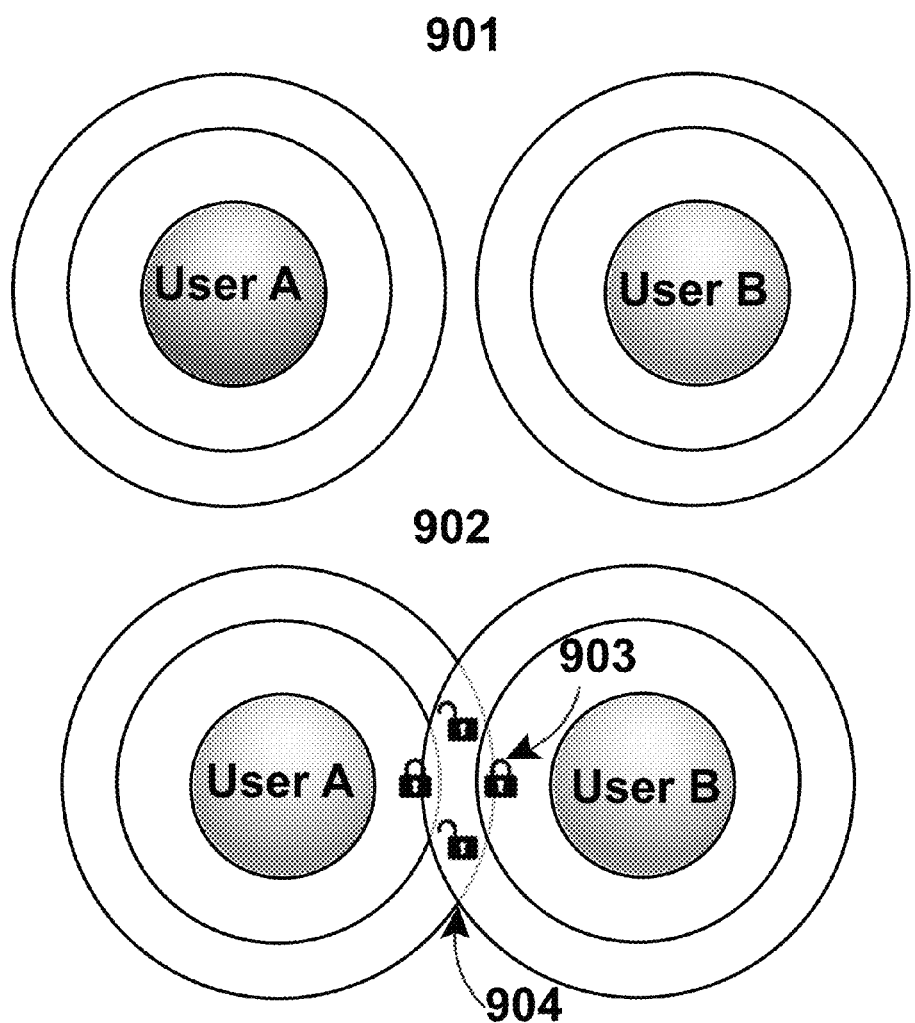
FIG. 9 Examples of the interaction between two or more users' Sphere of Influence security protocols and the acceptance or denial of data between any user's containers.

Interaction between two (2) user's Spheres of Influence, as illustrated in FIG. 9, can have an orbiting relationship (901) where there is no physical collision or interactivity between the containers. When container do intersect (902), pre-set security protocols, as defined by user, determine how much data is accepted or denied. In this example, user A can set their containers to restrict encroachment of user B (903). When allowed, a combined container (904) is created with mixed data from both users. In the case of hierarchical control where a specific user, say a parent, wants to limit and set security protocols for their child, they can do this via nesting security controls within their container, or creating a new managed security container whenever warranted.

Figure 10:
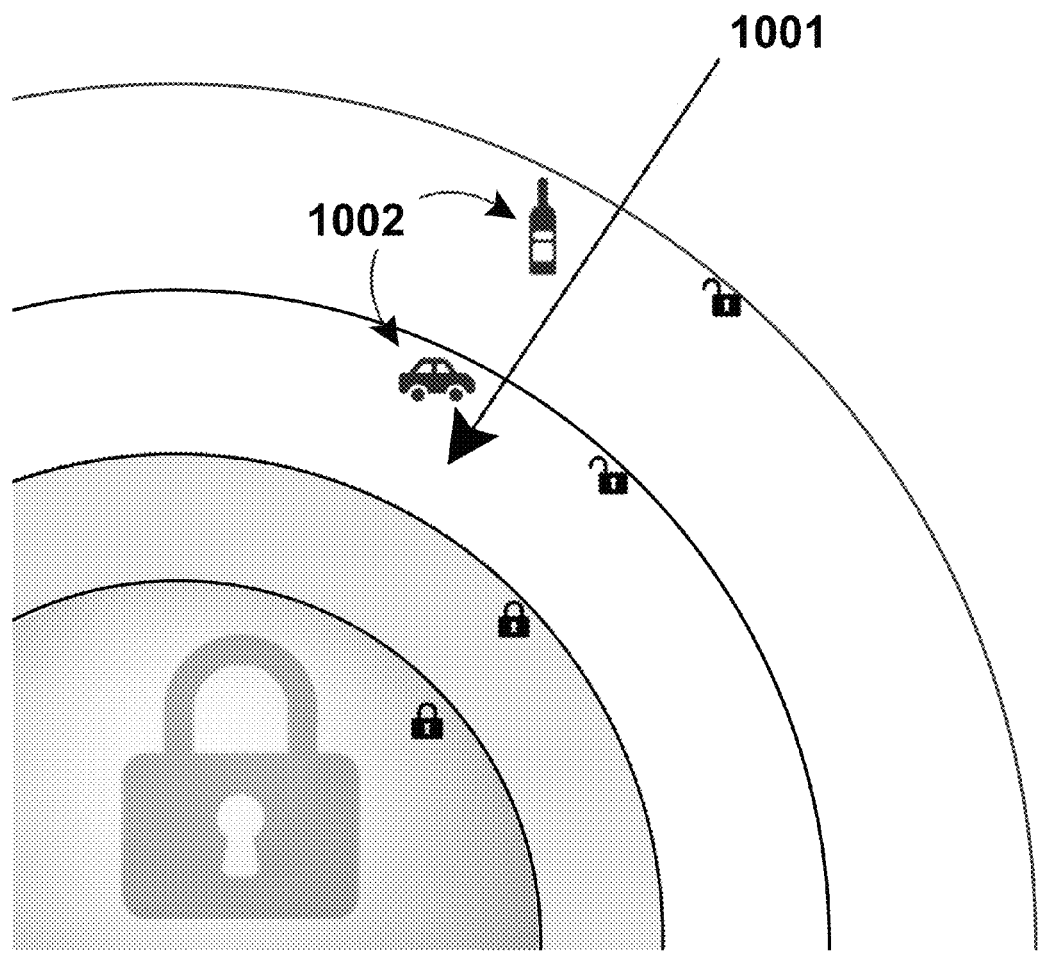
FIG. 10 Diagram of interaction between outside data, including advertising, and how users can control the permeation of information layer by layer.

Outside data, meaning any data that is not inherently contained or protected within a user's Sphere of Influence (soi), may include advertising and other forms of information that attempt to permeate a user's container layer by layer. FIG. 10 illustrates user controls over data that is sourced outside of their Sphere of Influence (soi), and how advertising and products are allowed to visually be shown and interact with user's data. Products, advertising and services (1001) can only permeate the layers that a user has allowed them to. Once within the sphere, outside data is connected to a set of three-dimensional polygon models which are visually drawn to screen. Users can allow specific products or companies to permeate specific layers (1002). Outside data is also given security protocols based upon what the individual wants. For instance, a user may wish to prohibit specific advertising of products, while at the same time, allowing data such as home security, to permeate all the way into their core.

Figure 11:
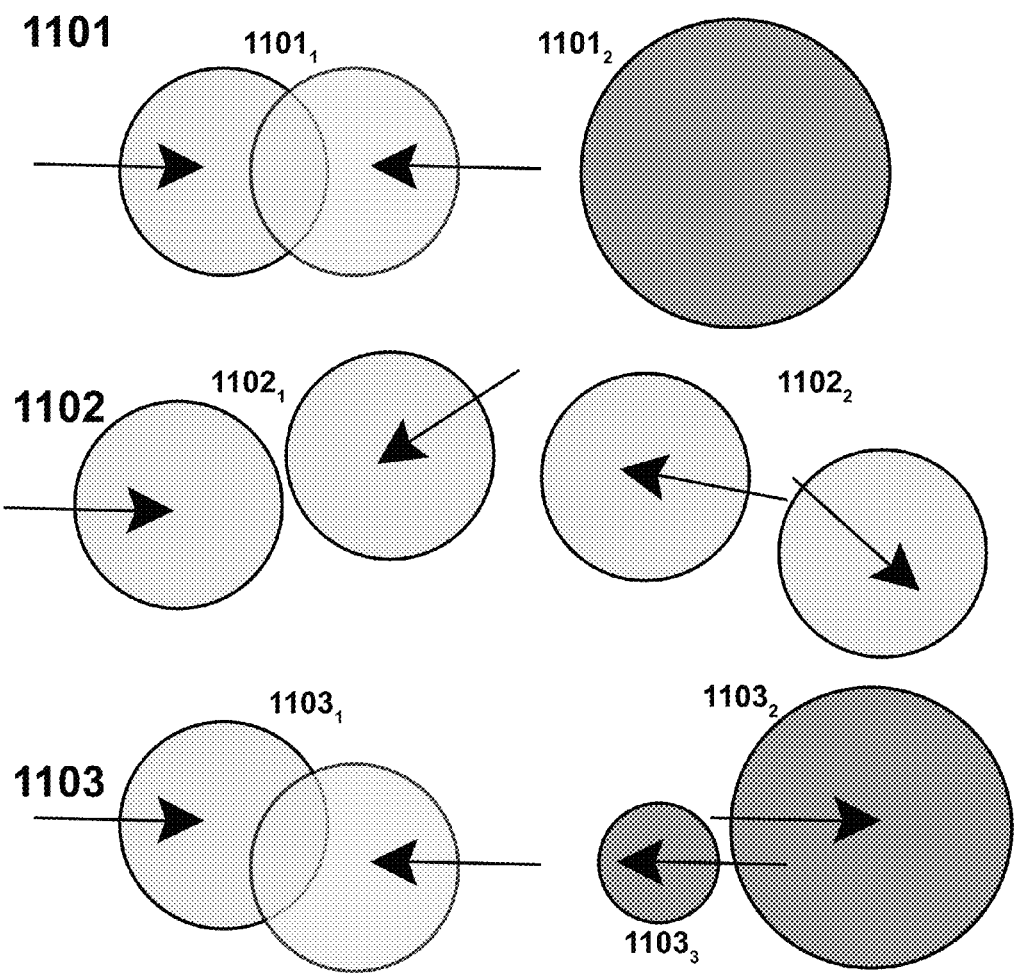
FIG. 11 Diagram of container data states as they relate to the combined state of two or more volumetric data containers.

Multiple data states can be created depending on how two or more containers interact. These containers can include data sources that were generated through the operating container or through user containers. As illustrated in FIG. 11, the combined state of data is consistent through the entire operating container, and can include a user's Sphere of Influence, data spheres/containers, product data or polygons and any other volumetric container. The merge state (1101) is where data from two or more containers ($1101_1$) merge, creating a new data container ($1101_2$). An example would be a data container of genealogy would be accepted, in its entirety, into a person's personal container. The reflect state (1102) is where data from two or more containers ($1102_1$) reflect off each other, creating a new data trajectory ($1102_2$). An example would be preventing specific restricted content types from entering your child's container. The refract state (1103) is where data from two or more containers ($1103_1$) partially merge, creating a new larger data container ($1103_2$) and a smaller residual data container ($1103_3$) from information that is not absorbed into the larger container. An example would be a community data container for racecar fans and a container with data of their favorite driver. The new larger container ($1103_2$) would create a more focused community of information on the sport and the driver. Whereas the smaller residual container ($1103_3$) would carry any unwanted data away.

Figure 12:
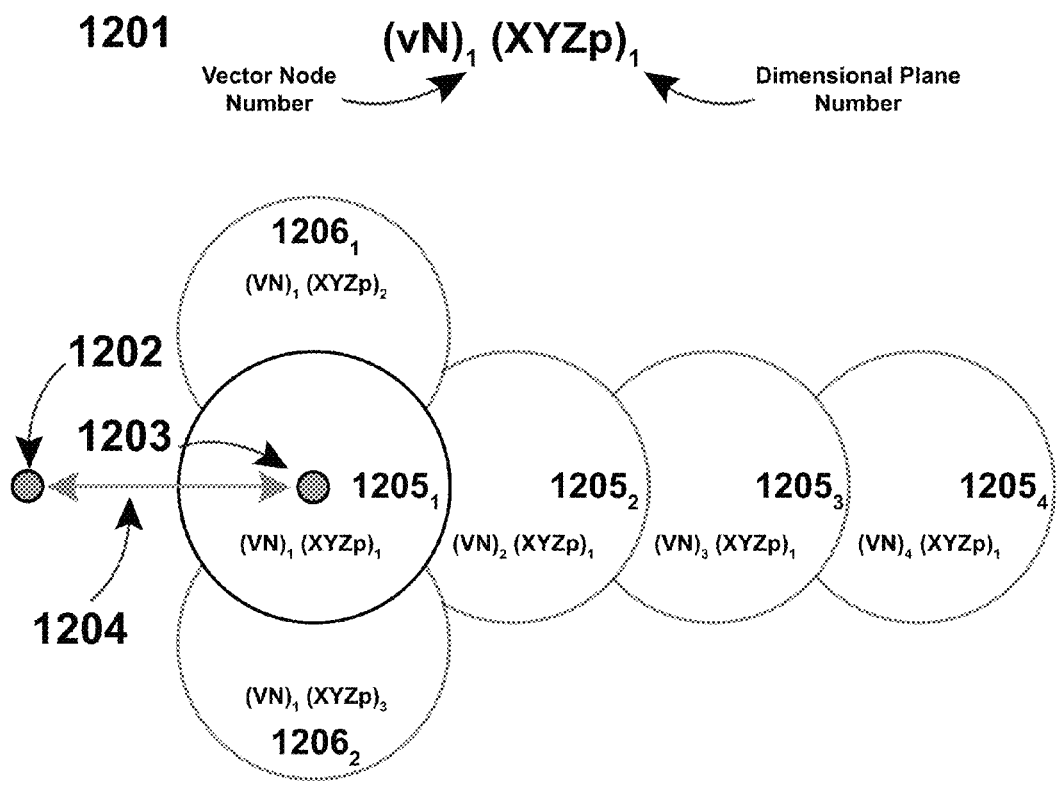
FIG. 12 Diagram of container relationships via Vector Node addressing on both a linear present timeline and multi-dimensional timeline shift.

Data containers, and the visual representation of data as three-dimensional polygons, can exist on both linear and multi-dimensional timelines. This allows users to have multiple sensory representations or experiences of their data, including visual, aural, tactile, smell and taste and any other sensory functions that may be discovered. FIG. 12 illustrates container relationships and addressing on both a present linear timeline and a multi-dimensional timeline. Either a user's core vector or vector node (vN)(1201), which is a distinct address at the core of all non-user containers, can have different values based on their position both in time and space. The relationship of (0,0,0,0) PRIME (1202), or prime vector, to the entire data container, or vector node (vN), can change based on different states of the data or position of the vector (1204). For example, the relationship between the Earth and the sun over a period of time. The address identifier string changes its time variable based on the relationship to the container's initial position:

Vector Node Position ($1205_1$)=$(vN)_1(XYZTp)_1$ with multiple states on a single timeline where the properties of the (vN) change with time ($1205_2$, $1205_3$ and $1205_4$).

Containers can exist in multiple states where the XYZ position and address is always consistent, and the planar (p), or dimensional, view has changed. ($1206_1$) and ($1206_2$) show a changed (vN) planar state to where the container exists on both a secondary and tertiary plane:

Plane 2 ($1206_1$)=$(vN)_1(XYZTp)_2$, Plane 3 ($1206_2$)=$(vN)_1(XYZTp)_3$

A user's core vector cannot change its position once it has been addressed, unless the core vector is intentionally re-positioned.

Figure 13:
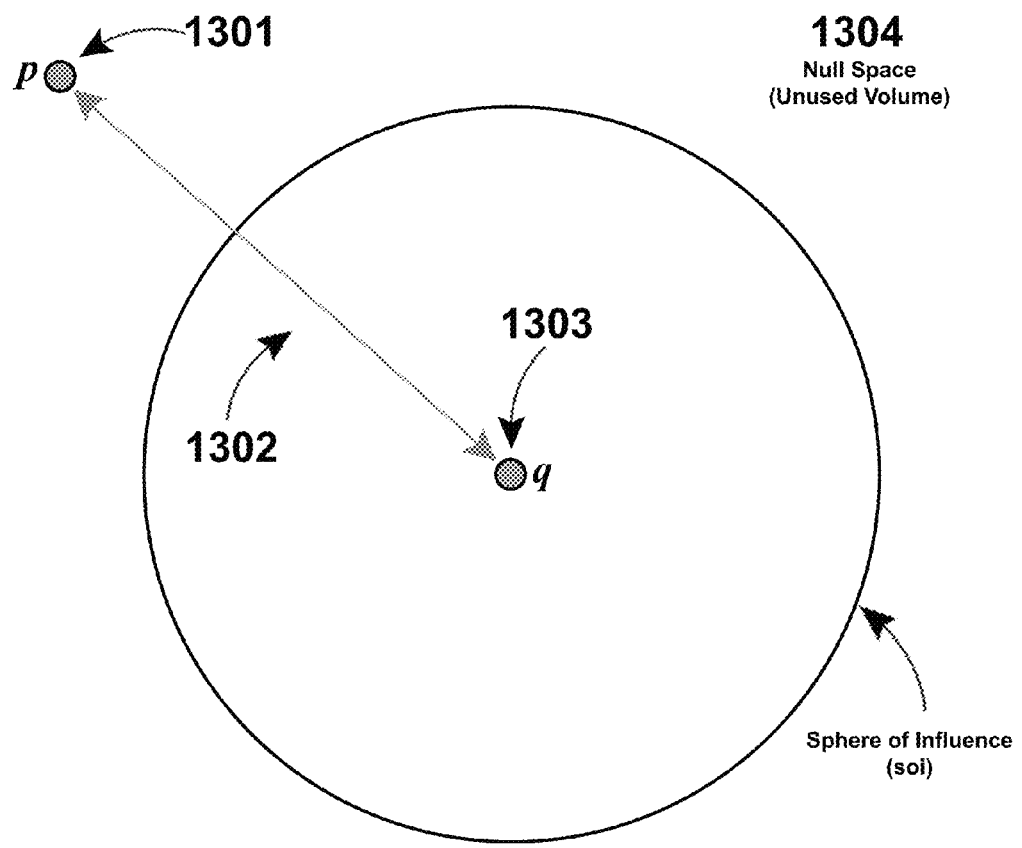
FIG. 13 Macro diagram of Universe Engine with distinct Vector Based Addressing System based on absolute center of (0,0,0,0) PRIME.

FIG. 13 illustrates the Universe Engine, which is the vector based addressing system which manages all data points within the operating container. (0,0,0,0) PRIME (1301) is the absolute center of the operating container. This position of this central vector is identical across all planar (p) or multi-dimensional views. The distance calculation (1302) uses the three dimensional Euclidean distance equation, $d(p,q,)=\sqrt{(p_1-q_1)^2+(p_2-q_2)^2+(p_3-q_3)^2}$, where (p) is (0,0,0,0) PRIME and (q) is the core vector (1303) of a user or data container. Each core vector (CV), within the operating container, is always the hierarchical parent to all attached containers, or Spheres of Influence, when dealing with addressing or movement of data. Null space (1304) is defined as any unused volumetric data space outside of any user or data container.

Figure 14:
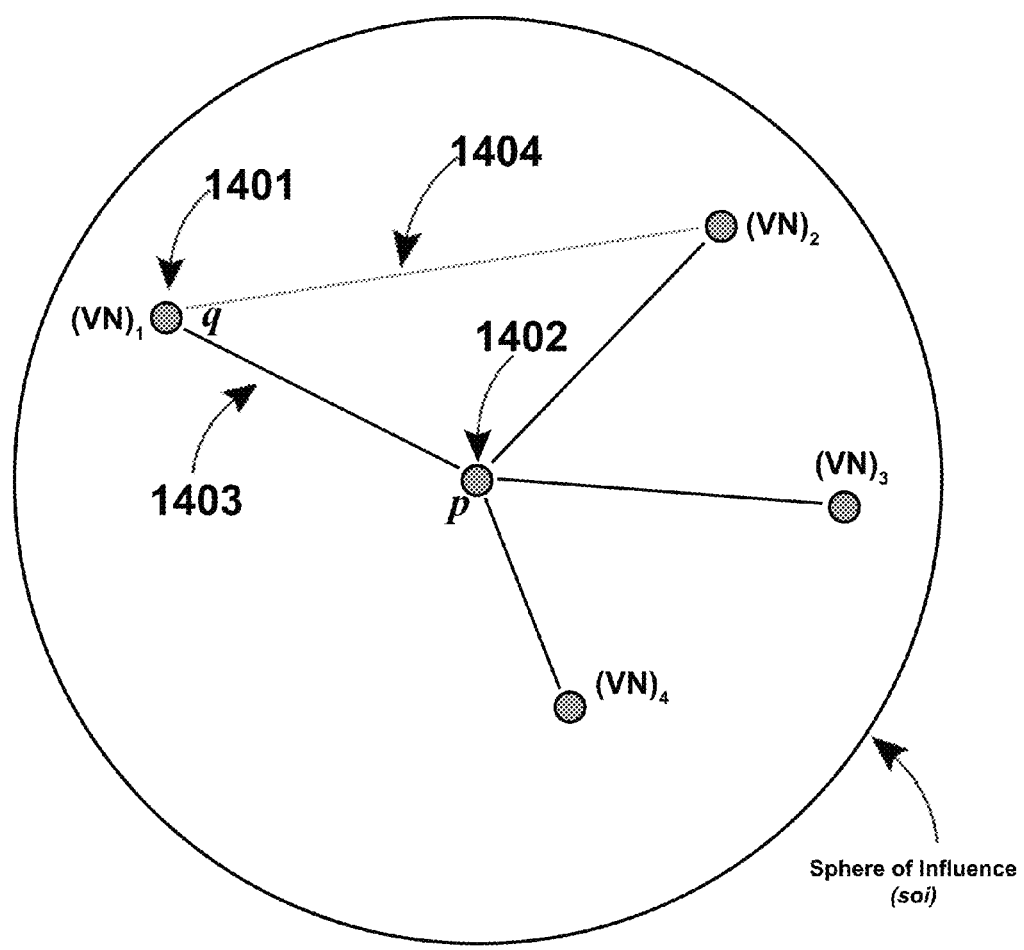
FIG. 14 Diagram of Parent/Child relationship between Vector Nodes and Sphere of Influence creating a distinct meta-data wrapper for each vector node address.

Vector nodes (vN), as illustrated in FIG. 14, show the (vN)(1401) as having a child hierarchical relationship to the Core Vector (CV) (1402). Users may have multiple vector nodes (vN) within their Sphere of Influence (soi). Multiple vector nodes (vN) are represented as:

$(vN)_1$, $(vN)_2$, $(vN)_3$, $(vN)_4$, . . .

Vector nodes (vN) can have either a direct node connection (1403), in which the data path or linking of (vN) is direct to the core vector (CV), or a secondary node connection (1404), in which the data path or linking is between two vector nodes. These would be represented as $(vN)_1$ and $(vN)_2$. All distances between any (CV) and (vN) are calculated using the same Euclidean equation:

$$d(p,q,)=\sqrt{(p_1-q_1)^2+(p_2-q_2)^2+(p_3-q_3)^2}.$$

Figure 15:
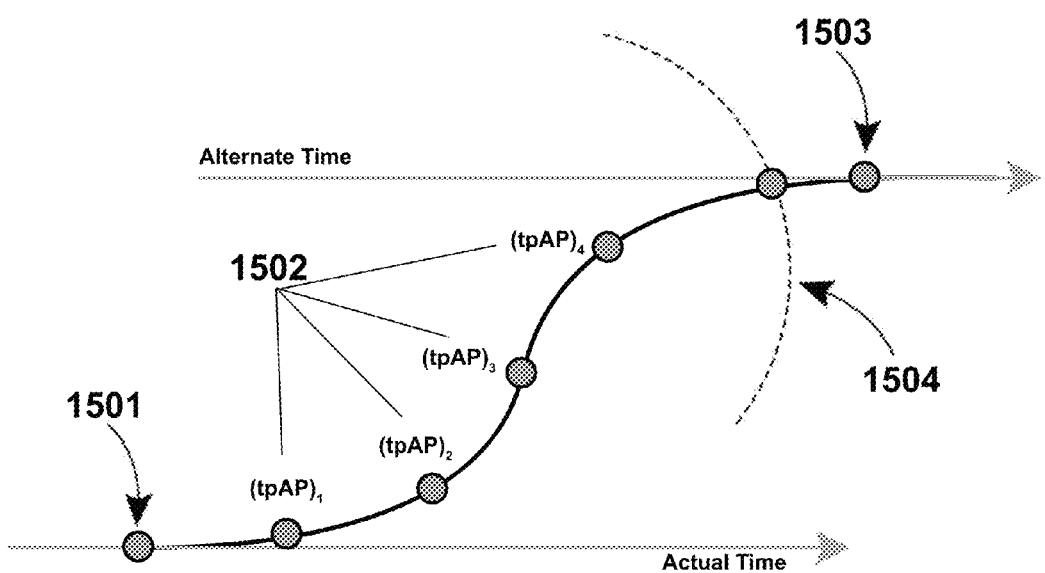
FIG. 15 Diagram of vector data with event triggers within a single linear timeline.

Data movement, within a single dimensional timeline, can be visually represented at different vectors points depending on event triggers that can shift data from one position to another. All vector nodes (vN) that have a migratory path, or any other representations of vector and/or addressing data within the operating container follow the parameters as set forth in FIG. 15. Data sets will always have an initial vector data position (1501). Once a data set begins movement, it starts an array of trans-events (1502) where vector data migrates and from one point in time to another, and one point in space to another, while staying on the same dimensional plane. These vectors are directly connected to pixel data, or a visual pixel, and are represented as transition pixels (tp). The alternate position of the data and/or pixel is represented as (AP). Together (tpAP) represents the transitional identifier vector data as it relates to visual pixels. (1503) represents the alternative data position as it relates to the initial vector data point. When dealing with multi-dimensional or multi-spatial migrating data sets, (1504) illustrates a transecting data set sourced from another path. While these examples represent pixels and visuals, the data movement can also represent any sensory data.

Figure 16:
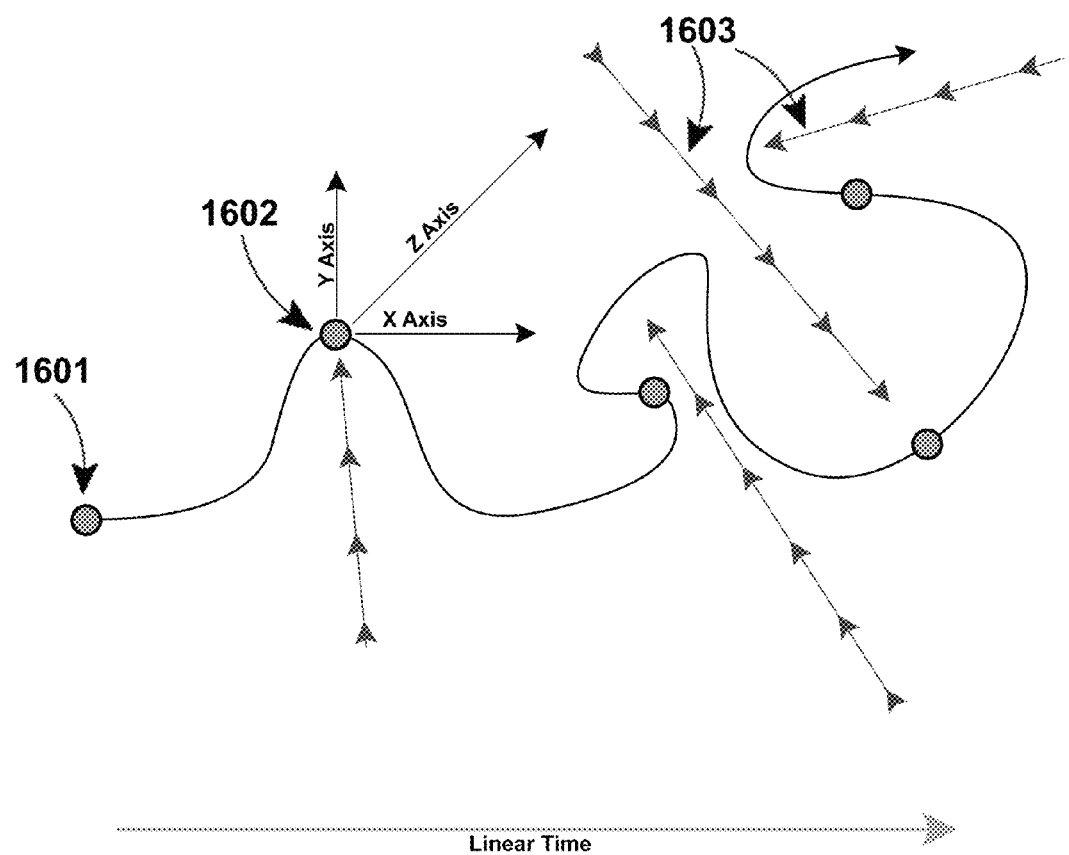
FIG. 16 Diagram of Vector and Pixel Movement influenced by other forces of data in X, Y and Z space.

Vector and pixel movement, within a single dimensional timeline, can be influenced by forces of data in the X, Y and Z space. FIG. 16 illustrates vector data, as visually represented by a pixel, as having inherent states of movement, including velocity and trajectory. These states can be influenced by outside data, creating new alternative vector data paths. From the initial vector point (1601) to the vector in movement state (1602), outside data forces (1603) can shift the intended path to have a more organic movement that can be visually represented as pixel data. An example would be a data container holding a specific feature film where the outside data forces could be containers of critic's reviews.

Figure 17:
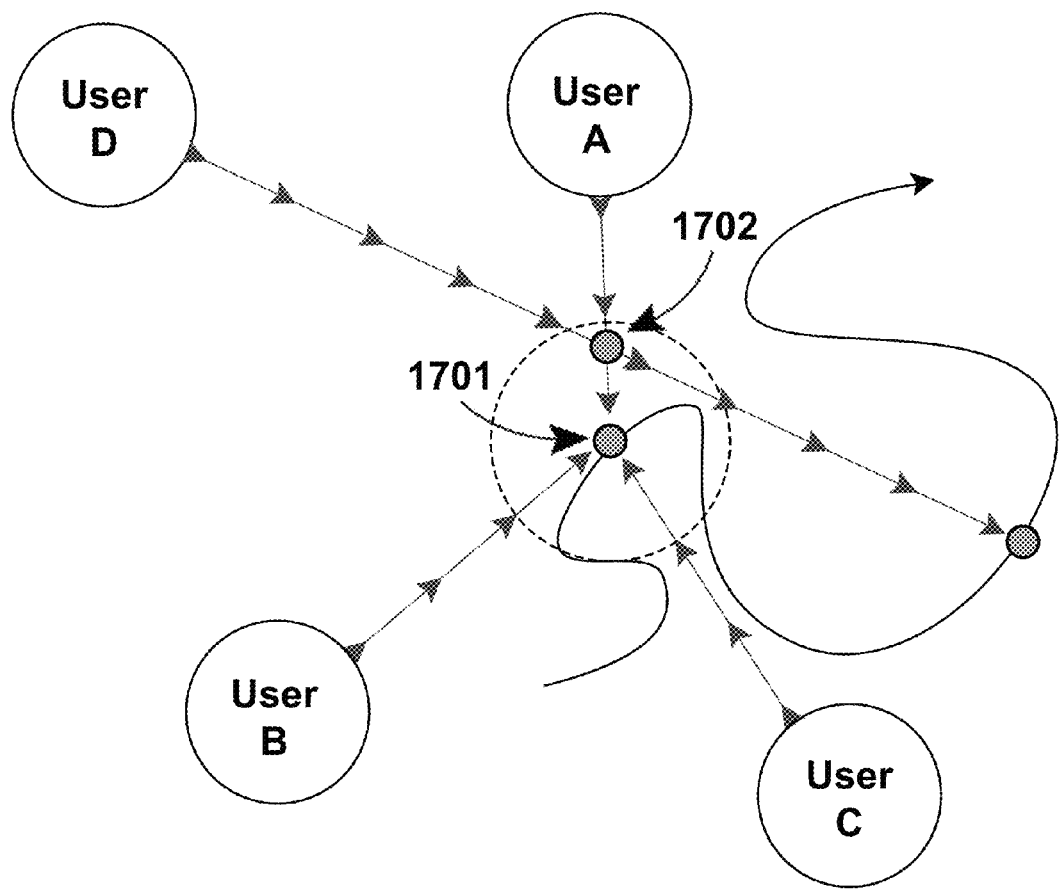
FIG. 17 Diagram of usage of intersecting vector data and the creation of new vector data and corresponding volumetric containers.

Vectors and data sets that have migrating paths may intersect as illustrated in FIG. 17. The intersection of vectors (1701) pertaining to information, conversations or relay of data between three or more users creates a new vector node (vN) with a distinct address and tracking data (1701). Data outside of this information, conversation or relay of data from another user or source on a different path, can create another distinct vector node (vN)(1702). An example would be three (3) users having a conversation about a medical procedure and a forth ($4^{th}$) user conversation separate from the current conversation, is searching for information about a naturopathic solution.

Figure 18:
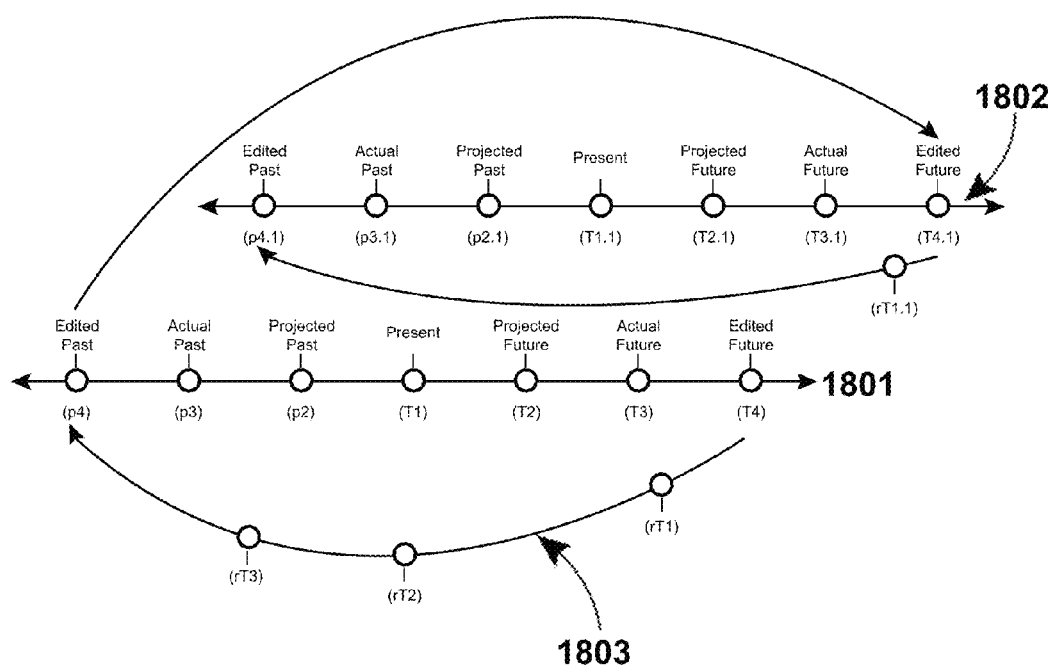
FIG. 18 Diagram of multi-dimensional vector data with time spirals.

Within the Operating Container, vector data not only has states of motion, but also multi-dimensional time states for both forward and reverse data. This system uses time lookup tables, allowing data and vectors to jump from one dimensional state to another, as well as from one time to another with different trajectory and velocity. FIG. 18 illustrates the concept of a time spiral effect from future and past vector points as they relate to multi-dimensions, and how that data is drawn through multiple planes. When starting with actual space and time (1801), data can migrate dimensionally by way of changing the data from the past to represent a new future timeline (1802). This is accomplished through reverse time lookups (1803) which begins a data loop where meta-data is tracked and rendered to screen in a new plane or dimensional view. This means that if the past time, as it relates to data, is changed, then a new alternative timeline is created, in essence creating a new dimensional view as well. For example, if a user, within virtual space, wants to go back in data history and discovers and inefficiency in a process, they can alter the data at that point in time, which would create a new timeline.

Figure 19:
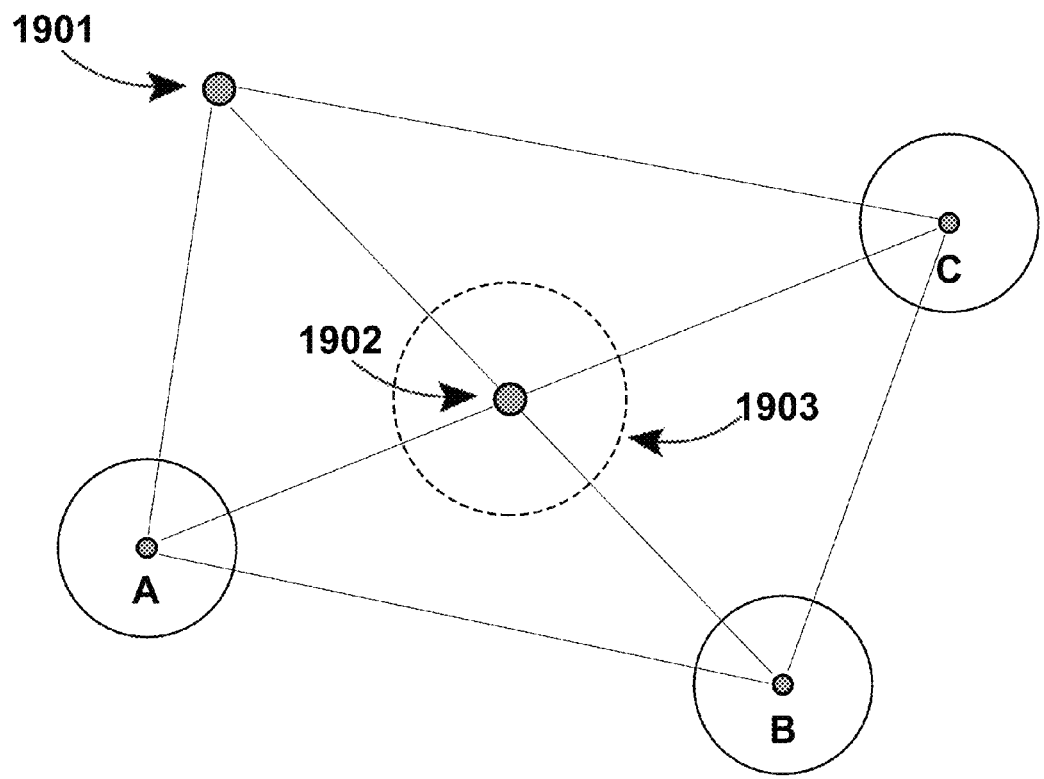
FIG. 19 Diagram and calculations for inter-vector nodes between two (2) or more containers on the same dimensional plane.

When two (2) or more containers communicate or transfer data on the same dimensional plane, an inter-vector node (iVN) is created. As illustrated in FIG. 19, the calculation to determine the vector address position (1902), as it relates to both the PRIME vector (1901) and two containers (A & C) is:

Inter-vector Node (iVN)=$A(XYZTp)_1 \cap C(XYZTp)_1$

The calculation for inter-vector nodes between multiple containers is:

Inter-vector Node (iVN)=$A(XYZTp)_1 \cap B(XYZTp)_1 \cap C(XYZTp)_1$

Figure 20:
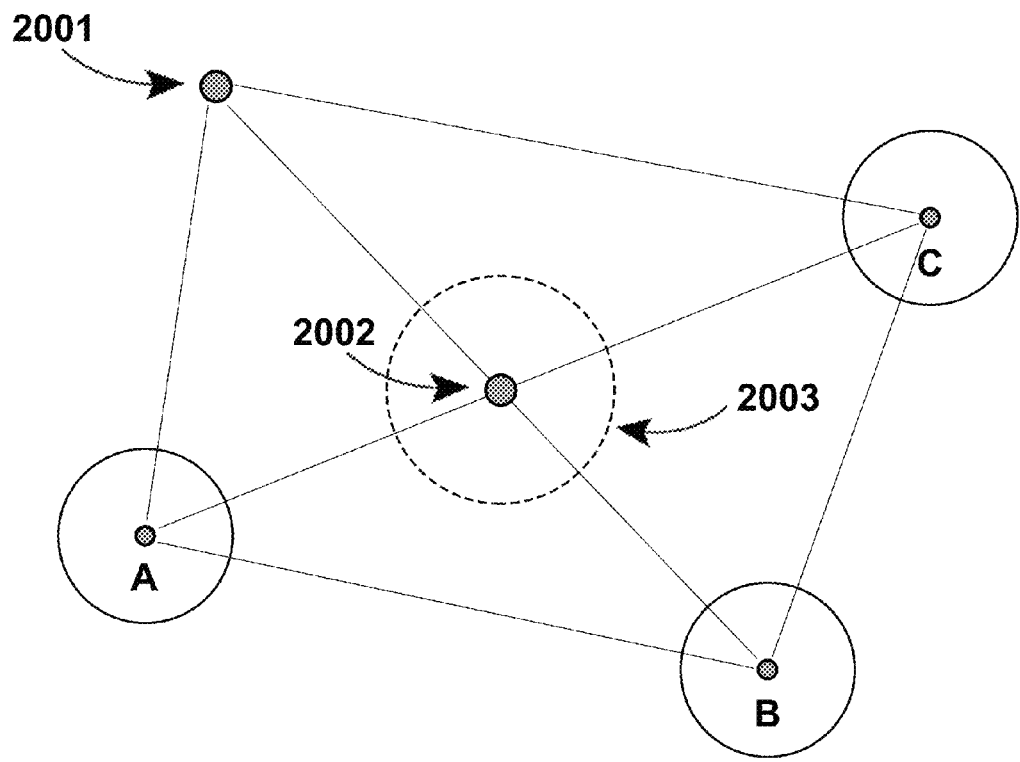
FIG. 20 Diagram and calculations for inter-vector nodes between two (2) or more containers on different dimensional planes.

When two (2) or more containers communicate or transfer data on different dimensional planes, an inter-dimensional vector node (idVN) is created. FIG. 20 illustrates the connections and calculations to create an unique address identifier across multiple planes as it relates to the PRIME vector (2001). Where the (idVN) between containers A & C can be calculated as follows:

Inter-dimensional Vector Node (idVN)=$A(XYZTp)_1 \cap C(XYZTp)_3$

Calculation of the (idVN) between multiple containers (A, B & C) can be calculated as follows:

$$(idVN)=A(XYZTp)_1 \cap B(XYZTp)_2 \cap C(XYZTp)_3$$

Figure 21:
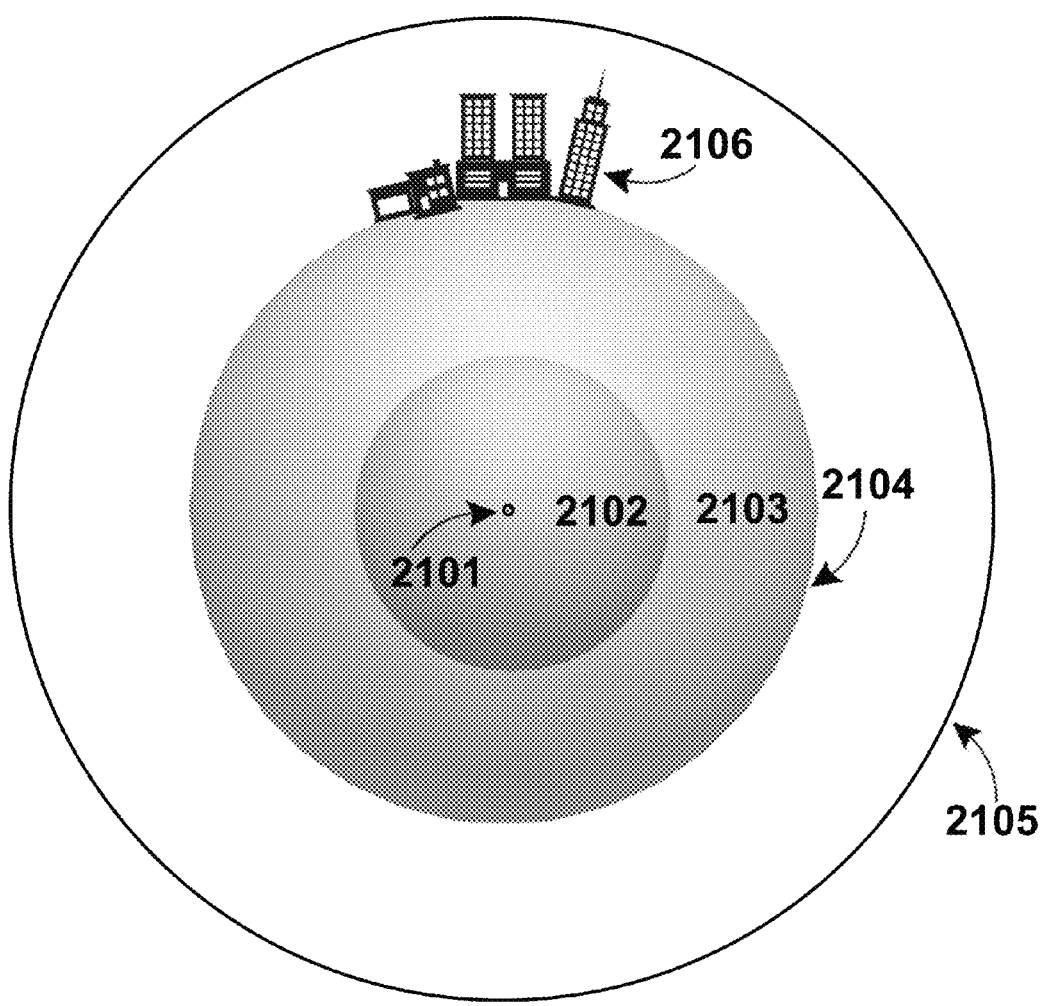
FIG. 21 Structure diagram of a user's typical container.

The structure of a typical user container, as illustrated in FIG. 21, always has an absolute center point, or core vector (CV) (2101). The core (2102) is the most central and secure user data container. The Terrene (2103) is the user container that is typically represented as visually solid surface. The Terrene surface (2104) is the mappable area in which communities and polygons are attached, which may include object anchored but not attached to the surface. Users can also build sub-Terrene structures, at least to the outer extent of the core, communities or polygon based objects. The outer Sphere of Influence (2105) is the outermost point at which a user's data is held and/or visually represented, and can include any objects not anchored to the Terrene surface. And the community (2106) which is the surface level grouping of polygons that form social, business and data related communities.

Figure 22:
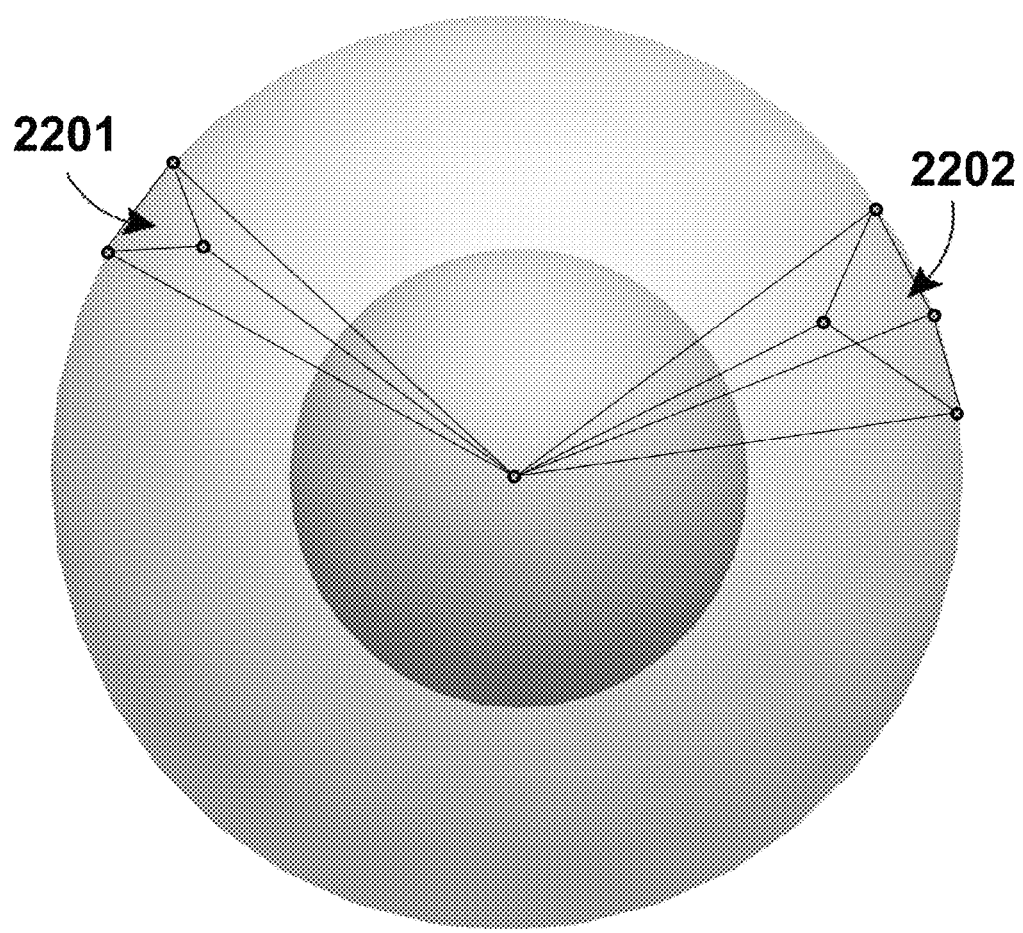
FIG. 22 Diagram of rigid containers.
Figure 23:
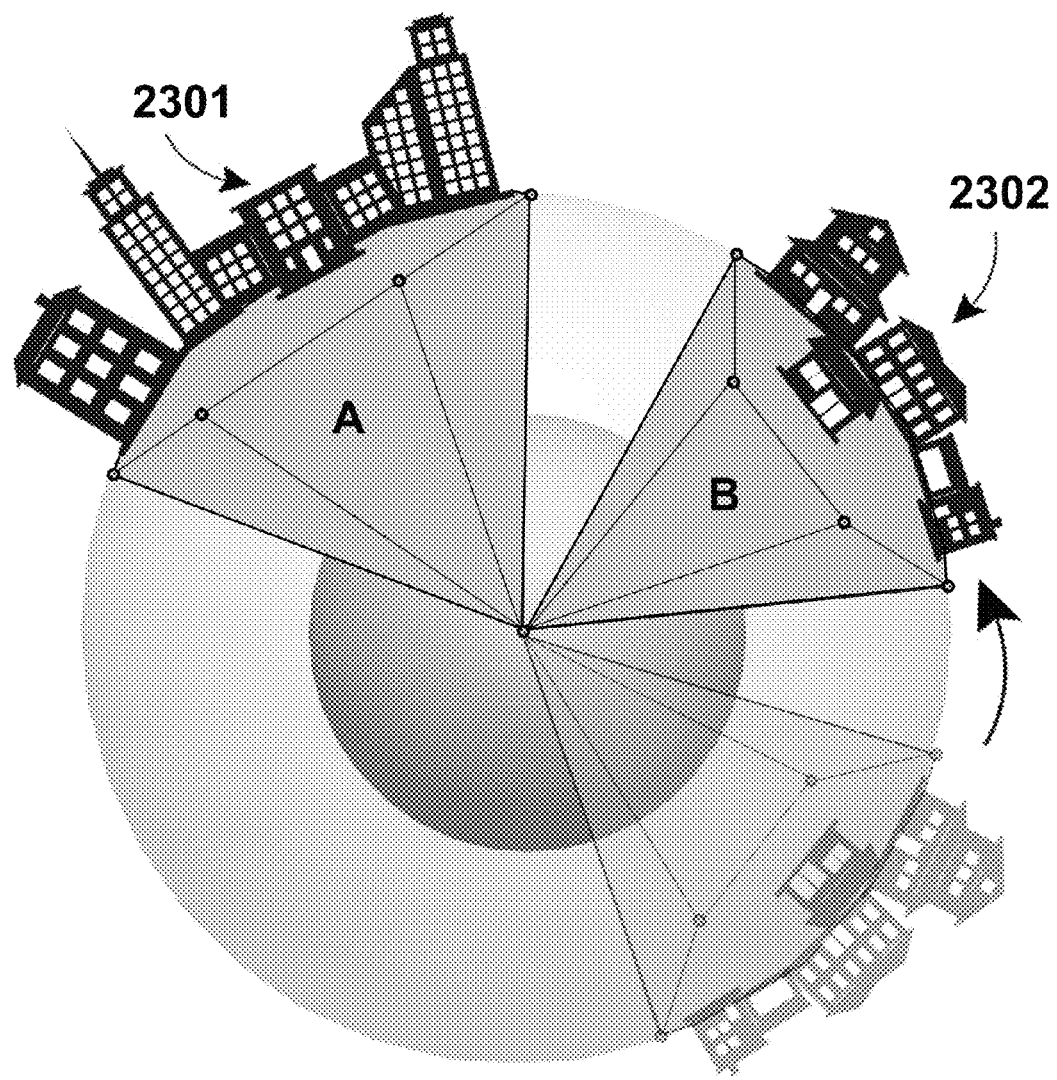
FIG. 23 Diagram of rigid container relationship to Terrene surface with clustering as communities when mapped against sphere or container.

Within each Terrene container are multiple rigid containers as illustrated in FIG. 22. Each rigid container always has a link to the user's core vector (CV), along with a minimum of three (3) additional surface vectors to form a simple volumetric container (2201). Surface containers can also have additional surface points which create more complex surface structures (2202).

Rigid containers are used to track and hold volumetric data, in a simpler form, as it relates to the Terrene surface and user generated communities. Surface level content, and or communities, can either stay in a specific position (2301) or shift along the surface (2302). For example video gamers can create one community where they meet up to strategize, and create another game community which tracks their exploits of the game. The second community would move as they progress through the game.

Figure 24:
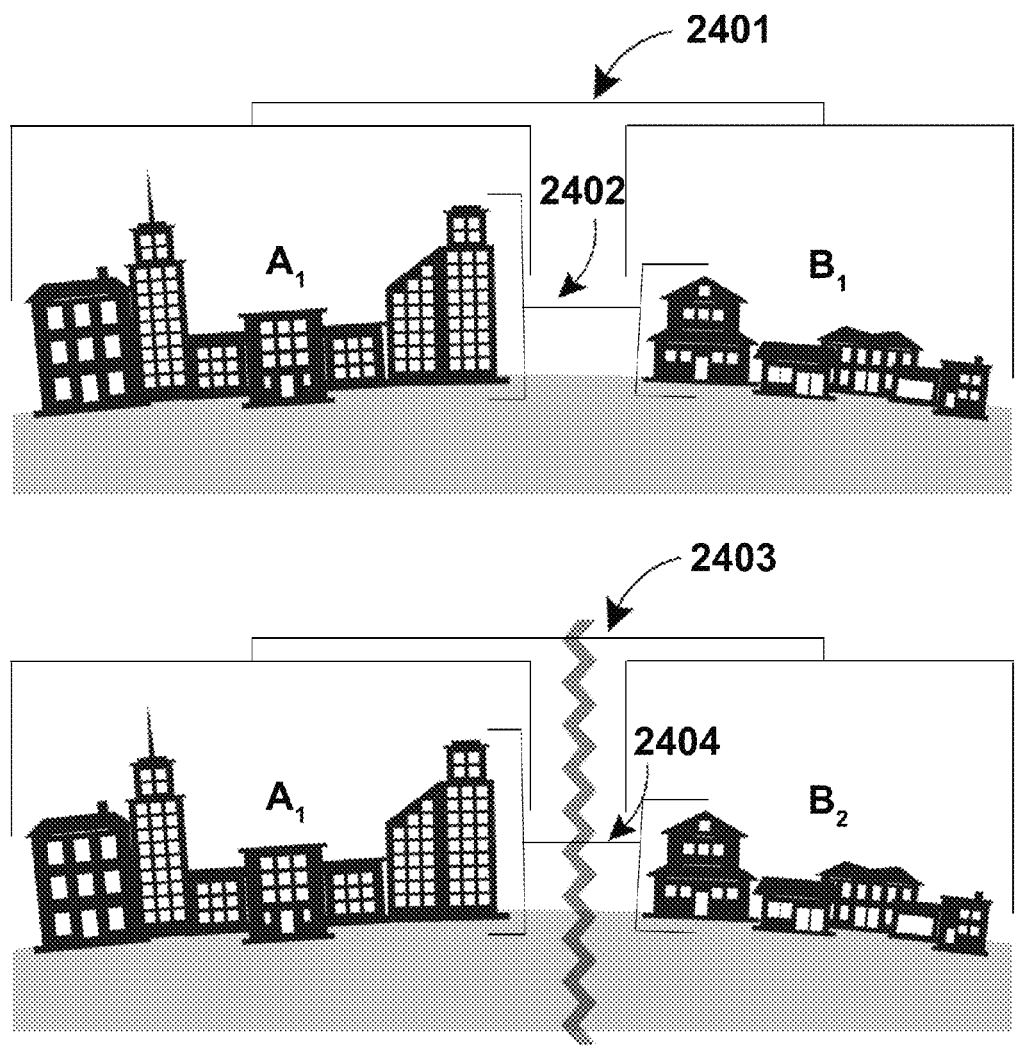
FIG. 24 Illustration of Terrene surface social communities and synergistic data relationships between those communities in both a linear timeline and multi-dimensional timeline.

Data can be synergistically exchanged between communities. Users can populate their Terrene surface with as many communities or polygon objects that will fit within the surface area and volumetric space with the Sphere of Influence (soi) as illustrated in FIG. 24. Meta-data information is exchanged between the communities, creating data bridges or pertinent information that is contextual to both, or multiple, communities and objects. Inter-community data exchange (2401) occurs when two communities exchange data on the same dimensional plane. Inter-object data exchange (2402) occurs when two objects exchange data on the same dimensional plane. Inter-dimensional community data exchange (2403) occurs when two communities exchange data on different dimensional planes. Inter-dimensional object data exchange (2404) occurs when two objects exchange data on different dimensional planes.

Figure 25:
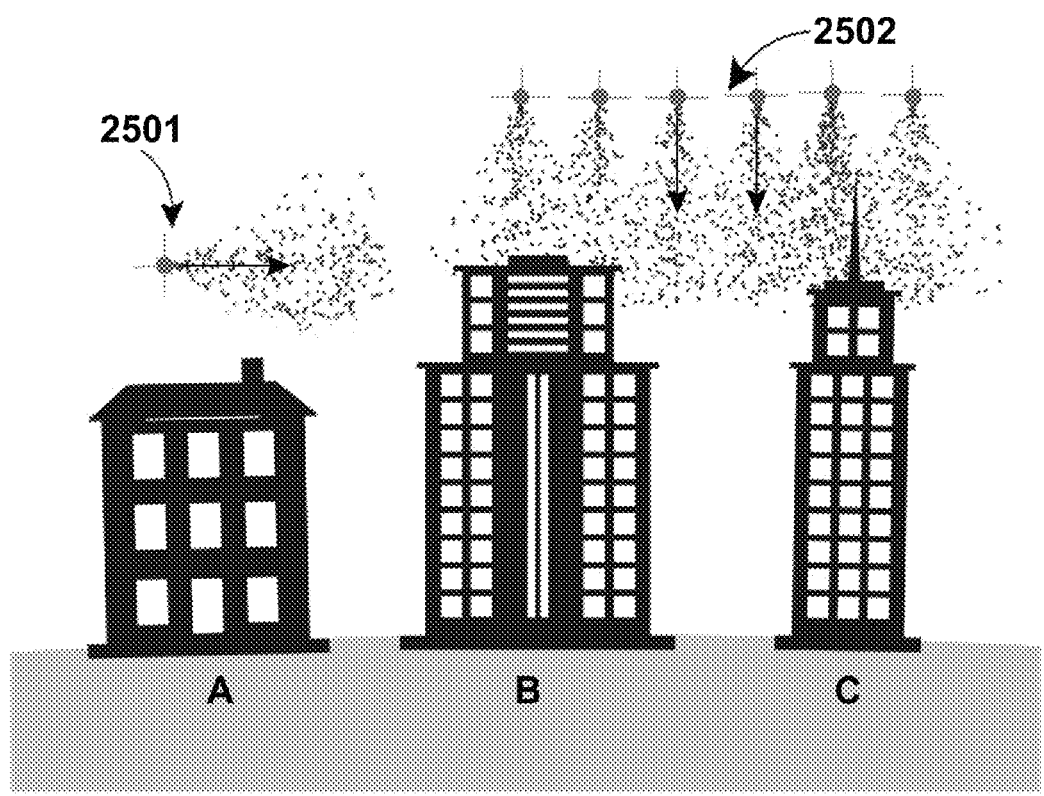
FIG. 25 Illustration of intra-community data represented as particle systems.

Data can also be synergistically exchanged from within a community or Sphere of Influence (soi). This data can be visually represented as a particle system or other methods of visually representing complex data arrays. FIG. 25 illustrates how data can be visually represented by particle emitters, and how the frequency and intensity of that data can change the particle type from one element to another (i.e. from fire to water). Single particle emitters (2501) can be attached to any parent polygon or object so that the relevant particle system surrounds the data it represents. Data can also be represented as multiple particle emitters (2502) for more complex data sets. For example, an array of servers creating a cloud computing environment can be visually represented as clouds surrounding structures that represent contextual data.

Figure 26:
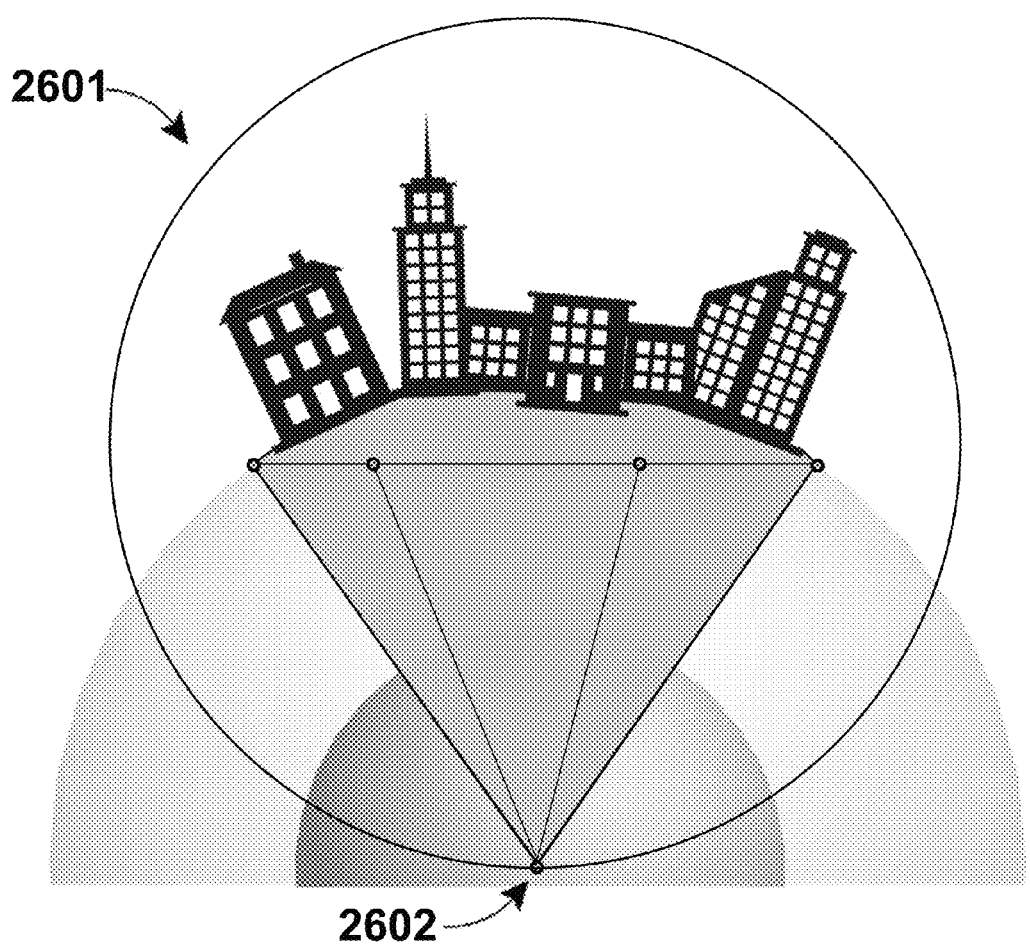
FIG. 26 Illustration of Sphere of Influence example when enclosing a polygon based social community and the subsurface relationship to any connected rigid containers.

Each community, and/or object, has a Sphere of Influence (soi) which encloses the polygon based communities. FIG. 26 illustrates the relationship of a community based Sphere of Influence (soi) (2601) to the core vector (CV), and how the (soi) inherits axial pivoting from the (CV) (2602) and also creates another security barrier. Intra-object security can be placed on a floor-by-floor and room-by-room basis. For example a user can give the penthouse of a specific building distinct security protocols, while the remaining building may be open to the public.

Figure 27:
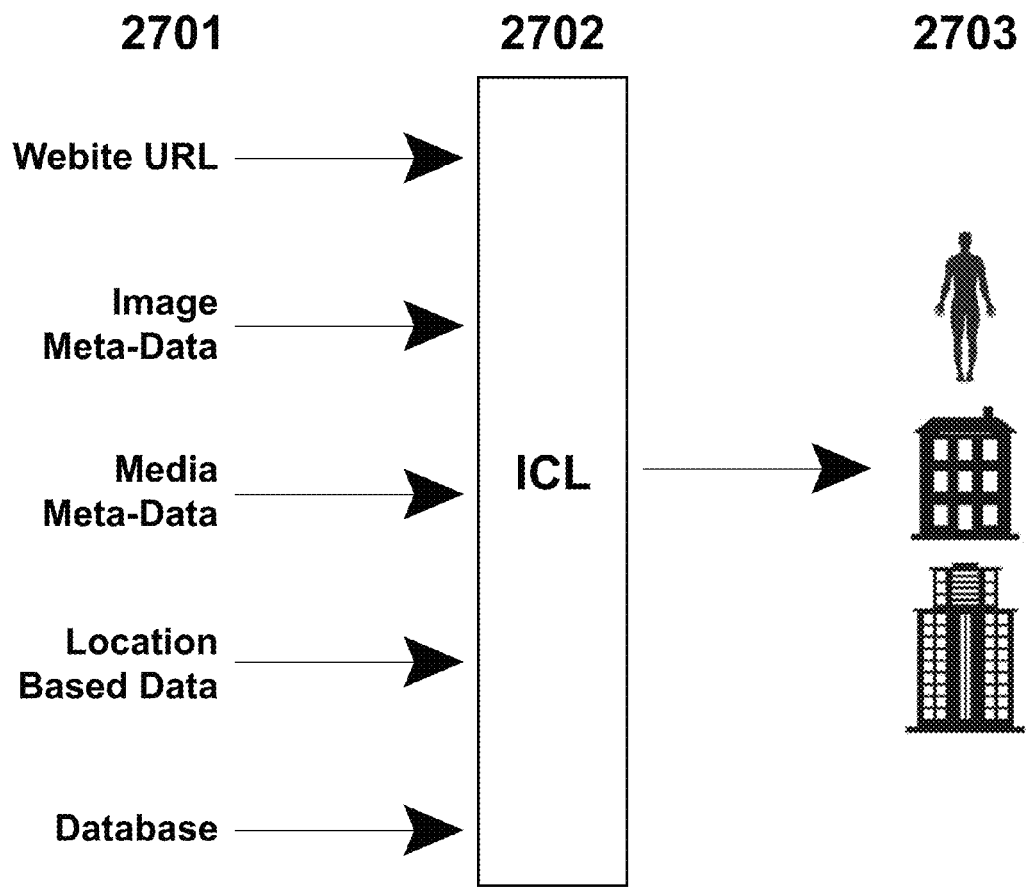
FIG. 27 Diagram showing threaded or "tethered" connections through the Immersive Corollary Library engine.

The corollary data that populates both the entire operating container is ingested and managed by a dynamic immersive corollary database called the Immersive Corollary Library (ICL). This unique master database and library creates a permanent link, or tether, between a three-dimensional object and a grouping of data, including; images, video, audio, code and real world data (global positioning systems, local positioning systems, motion capture data, tactile interfaces, gesture control). FIG. 27 illustrates the bridge (2702) between the web as it exists today (2701), gaming consoles and any type of immersive social environment or user interface that requires the translation of flat two-dimensional data into three-dimensional models (2703). Data can be extracted from a URLs, php, ajax, JSON, database or any other current or future source of data. Modeled data can be used to populate volumetric containers, communities or any other usage, including devices, of polygon models that have a direct tether to web data.

Figure 28:
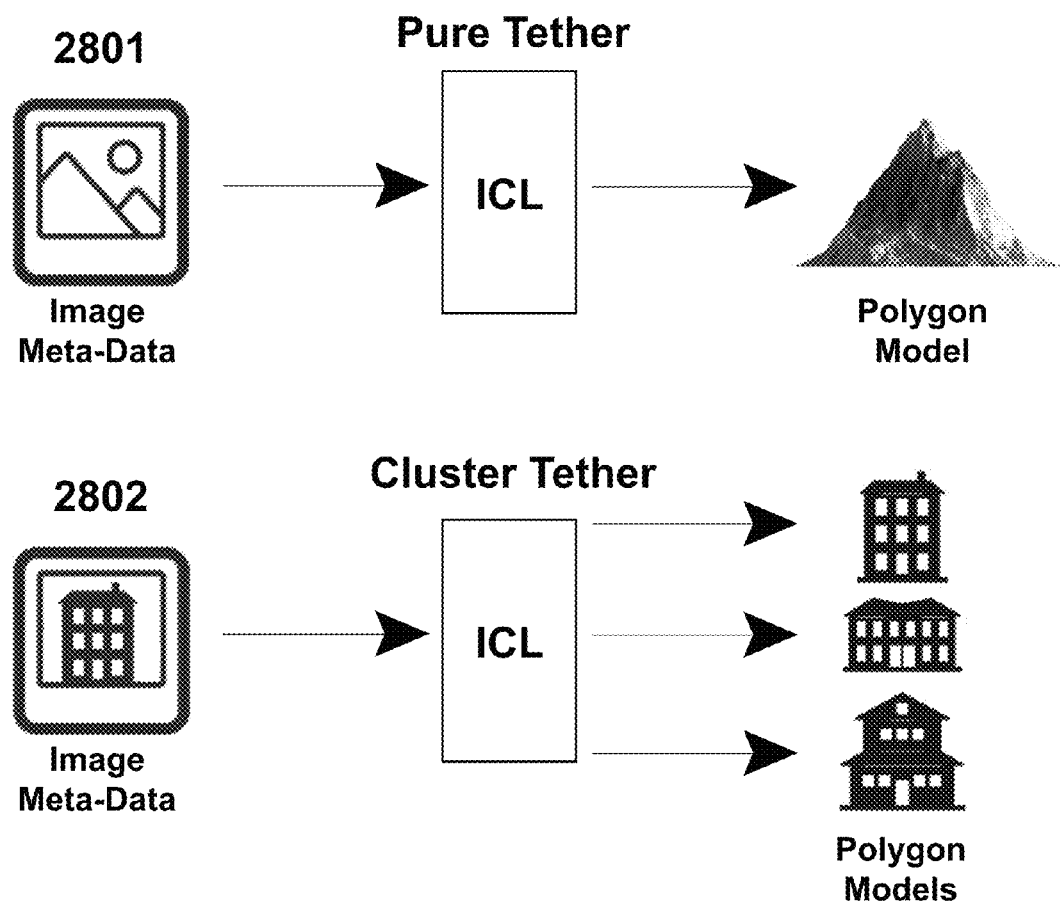
FIG. 28 Diagram showing pure-tethers and cluster-tethers and how that data is parsed through Immersive Corollary Library (ICL).

The tethering process, handled through the Immersive Corollary Library (ICL) has two types of connections as illustrated in FIG. 28. A Pure Tether (2801) is a one-to-one relationship of meta-data to a polygon model. A Cluster Tether (2802) is the linking of meta-data from one or more sources to multiple versions of polygons.

Each model or grouping of models has unique meta-data identifiers that create quick exchanges of data between two objects that are within certain proximity of each other, or that are being queried by the immersive search engine. These can be held within a community, any container, a hybrid link between a tethered URL, or any other addressing system, and object, or any other form of direct or indirect bridging between databases or libraries.

Figure 29:
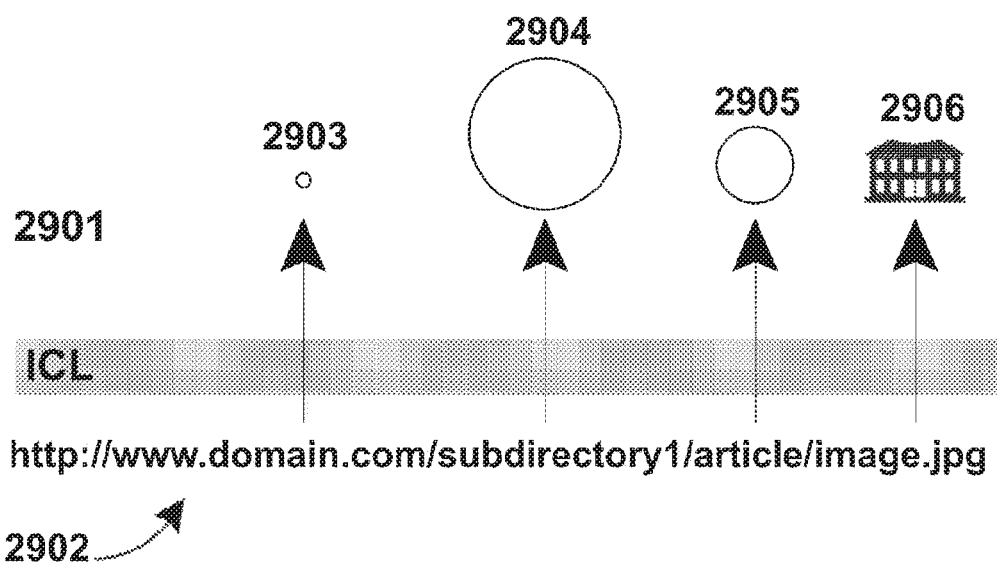
FIG. 29 Diagram showing the connection between user's core vectors, nodes and containers with tethered web URLs.

Web URLs have a distinct tether hierarchy as illustrated in FIG. 29. The Immersive Corollary Library (ICL) handles the tethering of URL directories, or any other addressing system, and content with vectors, containers and polygon objects. (2901) represents a grouping or community of containers and objects connected to a URL, any other addressing system or domain (2902). (2903) represents a domain name to vector node (vN) tether. (2904) represents a sub-directory to Sphere of Influence (soi) tether. (2905) represents a content directory to secondary Sphere of Influence (soi) tether. (2906) represents image or content meta-data to polygon model tether.

Figure 30:
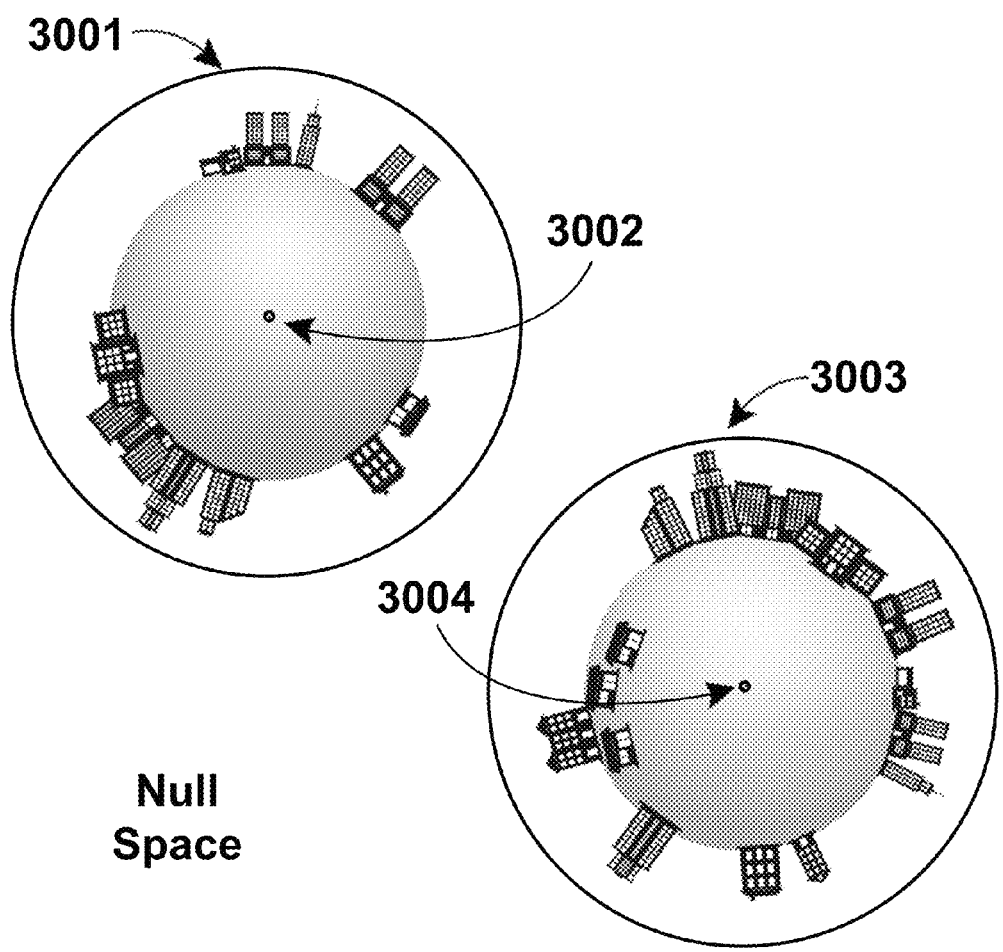
FIG. 30 Illustration showing the view of two respective users' nodes and their distinct vector address.

FIG. 30 illustrates the view of two respective user containers and their distinct vector addresses. Where (3001) represents user A's container and (3002) represents that user's core vector (CV). And (3003) represents user B's container with (3004) being that user's core vector (CV).

Figure 31:
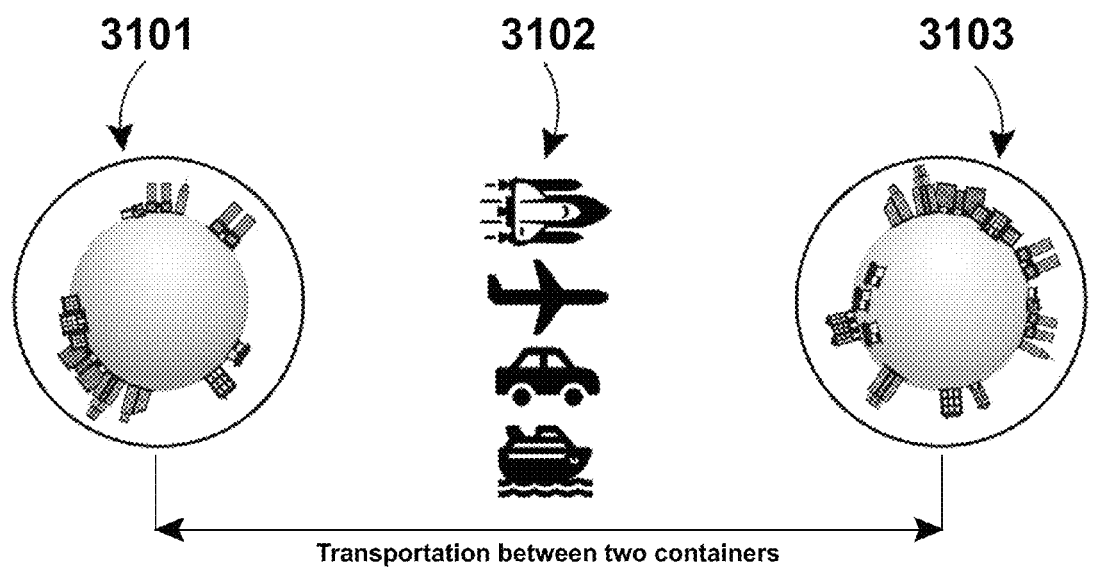
FIG. 31 Diagram showing point-to-point methods of transportation.

Within the volumetric operating container, on both single dimensional and multi-dimensional planes, there is are methods of transportation which visually, as well as multi-sensatory, represent point-to-point data transfers and communication. FIG. 31 describes transportation between two points, including container, communities, vector nodes (vN) and any other vector point(s). The visual, and/or sensatory, representations of transportation can either be viewed as first-person or third-person transit. (3101) and (3103) represent two distinct user containers and (3102) represents specific modes of transportation.

Figure 32:
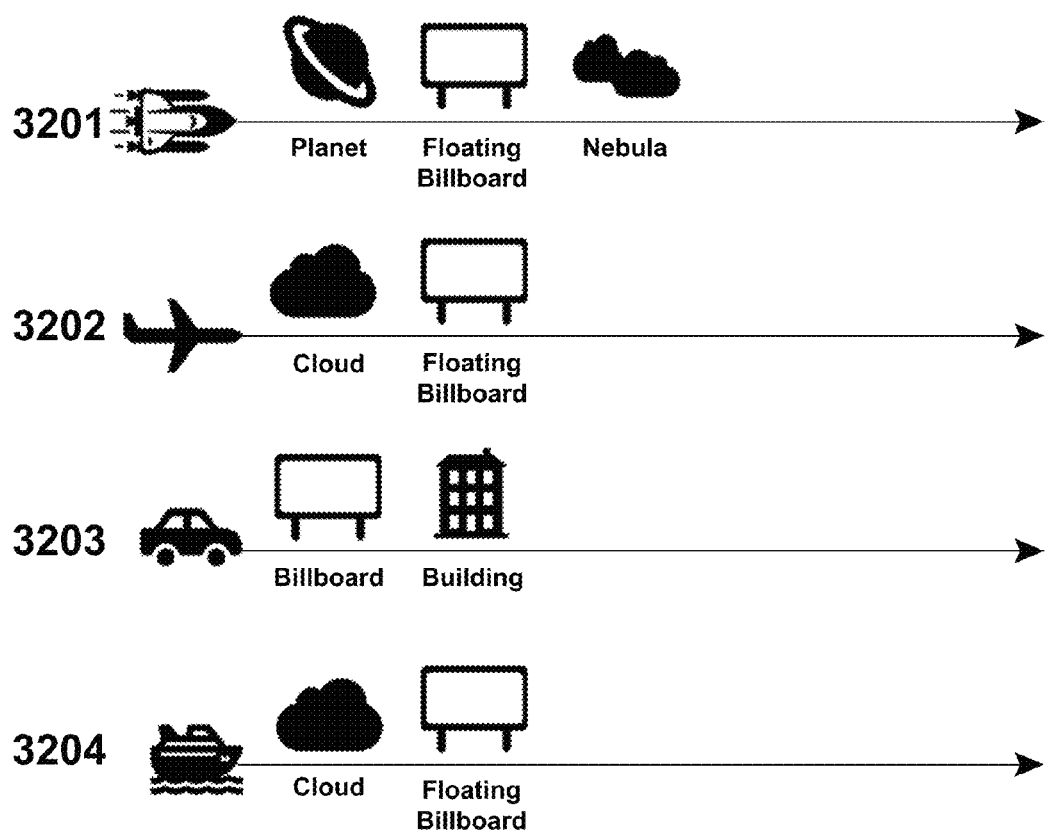
FIG. 32 Illustration example showing various advertising embodiments during transportation.

Since transportation and data not only becomes a journey for the user, but an immersive experience, advertising, and or sensatory experiences, can be implemented during the data transfer time between peers. FIG. 32 illustrates examples of transportation with advertising, but not limited to, space environment (3201), atmospheric environment (3202), community or ground environment (3203) and water environment (3204).

A proprietary immersive search engine allows users to input search queries by text input, a combination of gesture controls, or model based search, or any other type of sensatory interactivity, which is used by combining models to form a meta-data snapshot or a three-dimensional model depth based search to where any objects that are placed in the foreground take precedence over objects that are placed in the background, creating a unified search based on the type of models and their contextual meta-data, as well as their spatial relationship to each other. Search parameters may also include, but not limited to, time, velocity, trajectory and texture. The search results are either represented as highlighted objects or nodes within the backdrop of the universe, a remodeling of the core planet to show the results as three-dimensional model data, text and object descriptors are drawn in the volume of space around the planet, or objects and data are overlaid against any augmented reality viewport or display that allows the operating system to place virtual objects with geospatial data against real-world objects. The immersive search engine will recognize trends and suggest buildings, objects, both visual and implied, or sponsors that can either populate the user's container or augment the search information through paid sponsorship, memberships or other value-add products. All controlled by the user's sphere of influence preferences and how they allow sponsors to permeate each layer of their security protocol.

Any data that is visualized within this operating system will be part of an immersive analytical system, that uses custom algorithms that calculate the velocity of a moving vector within any container or immersive environment, and how that velocity correlates to the sphere of influence and other vectors. A value is placed on the aggregate velocity of any bound data sets so that an analytical figure can be calculated to represent the intrinsic real world monetary value of the movement of the vector and anything attached to it. This creates a means to advertise, and or communicate with a user, based on organic data as well as user sphere of influence preferences.

The more a person communicates with another, the more data that is exchanged or contextual, the closer in proximity that other object or user's container will appear, as if organizing into a community of containers. This same set of boundary identifiers allows users from the core-out management view to choose how many spheres of influence they want, what the security protocols are for each sphere, what data is allowed to permeate which sphere and when, and what users are allowed to access specific data, objects or communities. This security protocol also allows users to block other users from encroaching on a specific neighborhood of spheres. Once two or more spheres have begun to overlap, a new organic volumetric data container is birthed. Through the combined aggregate of all containers within the operating system, a spatial volumetric cost-per-pixel algorithm calculates the actual volume of three-dimensional pixel space surrounding a specific community or property, which is then calculated and a dollar figure is given to that real-estate or asset.

The volumetric operating system is cross-platform, and can include, but not limited to pc, mobile, tablet, gaming console, and all other current and future devices, so that applications and data can be synced across a wide array of technology and distribution modes, as well as giving the user a single unified visually immersive experience.

The Data Visualization Engine is a raw data view of the information held within the operating container. This can include, but not limited to, algorithms, equations, vector data, polygon data any and any other visual representation of data or math.

The Inter/Intra-Spatial Marketing and Product Engine is a contextual object oriented system that injects advertisers and manages the intra-spatial and inter-special analytical values that determine the specific real-time value snapshots of data that has been derived organically from the connectivity of all other core engines. This engine bridges real-world data from any source, including, but not limited to, global positioning systems, gesture control, motion control, radio frequency motion capture, reflective motion capture and/or any product tracking mechanism.

The entire operating container, in a dimensional embodiment, will have a "Universe" skin which is a scaled down representation of the known universe. Stellar data is used to create an active volumetric skin where containers, vector nodes (vN), polygons, objects and migrating data sets are represented as, but not limited to, planets, moons, stars, nebulas, galaxies, wormholes, black holes and other stellar objects.

The virtual universe model is the initial visual implementation of the volumetric vector node and object based multi-dimensional operating container. The total view can be changed to fit within a business-to-business solution infrastructure or an application specific user interface (UI). Thus, specific embodiments and applications of the inventive subject matter have been disclosed. It should be apparent, however, to those skilled in the art that many more modifications besides those already described herein are possible without departing from the inventive concepts herein. The inventive subject matter, therefore, is not to be restricted except in the spirit of the appended claims.

What is claimed is:

1. A volumetric vector addressing system comprising:
   a database for storing a set of multi-dimensional vector addresses and metadata describing the multi-dimensional vector addresses as defined from an origin of a multidimensional shared virtual environment, the metadata including:
      a set of multi-dimensional volume definitions associated with a subset of multidimensional vector addresses in the set of multi-dimensional vector addresses,
      wherein a multi-dimensional volume definition associated with a multidimensional vector address defines a container; and
      a set of computing resource addresses associated with a set of containers formed from a subset of multi-dimensional volume definitions in the set of multi-dimensional volume definitions;
   a network interface configured to receive a computing resource request from a computing device operating within the a multi-dimensional shared virtual environment, the request including a multi-dimensional vector address and provide a translation from the multidimensional vector address to an associated set of computing resource addresses;
   a processor managing the multi-dimensional shared virtual environment and configured to:
      receive the request from the network interface for computing resources including a multi-dimensional vector address;
      determine a container that contains the multi-dimensional vector address based at least in part on the metadata;
      determine the associated set of computing resource addresses associated with the container;
      generate a message including the translation from the multidimensional vector address to the associated set of computing resource addresses;
      receive a request to associate a new container with a requested set of computing resources, the container defining a requested multi-dimensional vector address and a requested volume definition;
      determine a lack of overlap of the new container with the set of containers;
      add the requested multi-dimensional vector address to the set of multidimensional vector addresses; and
      create additional metadata describing the requested multi-dimensional vector address including the requested volume definition and the requested set of computing resources.

2. The system of claim 1, wherein the multi-dimensional vector addresses, the multi-dimensional volume definitions and the containers describe virtual representations of a three dimensional environment.

3. The system of claim 1, wherein the resource addresses provide visual representations of the volume.

4. The system of claim 1, wherein the multi-dimensional vector addresses include a spatial component.

5. The system of claim 4, wherein the multi-dimensional vector addresses include a time component.

6. The system of claim 5, wherein the multi-dimensional vector addresses include an alternate timeline component.

7. The system of claim 1, wherein the multi-dimensional vector addresses are based on a difference from a prime vector.

8. The system of claim 1, wherein the containers can be assigned a trajectory or a destination.

9. The system of claim 8, wherein an event or trigger can cause a container to be assigned the trajectory or the destination.

10. The system of claim 1, wherein the container contains the multi-dimensional vector address.

11. The system of claim 1, wherein the multi-dimensional vector address is external to the container.

12. The system of claim 1, wherein an authorization check is performed on the computing resource request.

13. The system of claim 12, wherein an overlap of two or more containers represent shared computing resources that can be authorized based on a successful authorization check for any of the two or more containers.

14. The system of claim 12, wherein an overlap of two or more containers represent shared computing resources that can be authorized based on a successful authorization check for each of the two or more containers.

* * * * *